United States Patent
Lincourt, Jr. et al.

(10) Patent No.: US 12,182,208 B2
(45) Date of Patent: Dec. 31, 2024

(54) BUSINESS INTENT-ASSISTED SEARCH

(71) Applicant: Dell Products L.P., Round Rock, TX (US)

(72) Inventors: Robert Anthony Lincourt, Jr., Franklin, MA (US); Stephen James Todd, North Andover, MA (US); Eloy Francisco Macha, Crowley, TX (US); David Edward Frattura, Stamford, CT (US)

(73) Assignee: Dell Products L.P., Round Rock, TX (US)

( * ) Notice: Subject to any disclaimer, the term of this patent is extended or adjusted under 35 U.S.C. 154(b) by 108 days.

(21) Appl. No.: 18/162,311

(22) Filed: Jan. 31, 2023

(65) Prior Publication Data
US 2024/0256614 A1    Aug. 1, 2024

(51) Int. Cl.
| | | |
|---|---|---|
| *G06F 17/00* | (2019.01) | |
| *G06F 7/00* | (2006.01) | |
| *G06F 16/901* | (2019.01) | |
| *G06F 16/903* | (2019.01) | |
| *G06F 16/9035* | (2019.01) | |
| *G06F 16/9038* | (2019.01) | |
| *G06F 16/907* | (2019.01) | |
| *G06Q 10/067* | (2023.01) | |

(52) U.S. Cl.
CPC ...... *G06F 16/9038* (2019.01); *G06F 16/9024* (2019.01); *G06F 16/90335* (2019.01); *G06F 16/9035* (2019.01); *G06F 16/907* (2019.01); *G06Q 10/067* (2013.01)

(58) Field of Classification Search
CPC ............... G06F 16/9038; G06F 16/907; G06F 16/90335; G06F 16/9035; G06F 16/9024; G06Q 10/067
USPC ........................................................ 707/718
See application file for complete search history.

(56) References Cited

U.S. PATENT DOCUMENTS

| | | | | |
|---|---|---|---|---|
| 7,991,757 B2* | 8/2011 | Kane, Jr. | ............ | G06F 16/9535 707/706 |
| 2003/0172161 A1* | 9/2003 | Rymon | ................. | G06Q 10/10 709/226 |
| 2005/0038533 A1* | 2/2005 | Farrell | ............... | G06F 16/9024 707/E17.011 |
| 2009/0171968 A1* | 7/2009 | Kane | ................... | G06F 16/9535 707/999.01 |
| 2011/0191143 A1* | 8/2011 | Chao | ................. | G06Q 10/0637 705/348 |
| 2014/0122039 A1* | 5/2014 | Xu | ........................ | G06F 18/213 703/2 |

(Continued)

*Primary Examiner* — Pavan Mamillapalli
(74) *Attorney, Agent, or Firm* — Chamberlain, Hrdlicka, White, Williams & Aughtry; Aly Dossa

(57) ABSTRACT

A method and system for business intent-assisted search. A business intent may generally refer to information, respective to an organization user, which may pertain to or describe the engagement of the organization user within and/or outside their organization (e.g., a commercial business, an education institution, etc.). Embodiments disclosed herein, accordingly, implement search query processing based on the business intent modeled for the search query submitter (e.g., an organization user). Further, a recall of any returned information, relevant to the search query, may be contingent on and/or directly correlated with a completeness of the modeled business intent for any given organization user.

18 Claims, 26 Drawing Sheets

(56) References Cited

U.S. PATENT DOCUMENTS

2014/0200824 A1\* 7/2014 Pancoska ............... G16B 20/20
 702/19
2015/0169758 A1\* 6/2015 Assom .................... G06F 16/36
 707/603
2017/0351406 A1\* 12/2017 Rossi .................. G06F 3/04842

\* cited by examiner

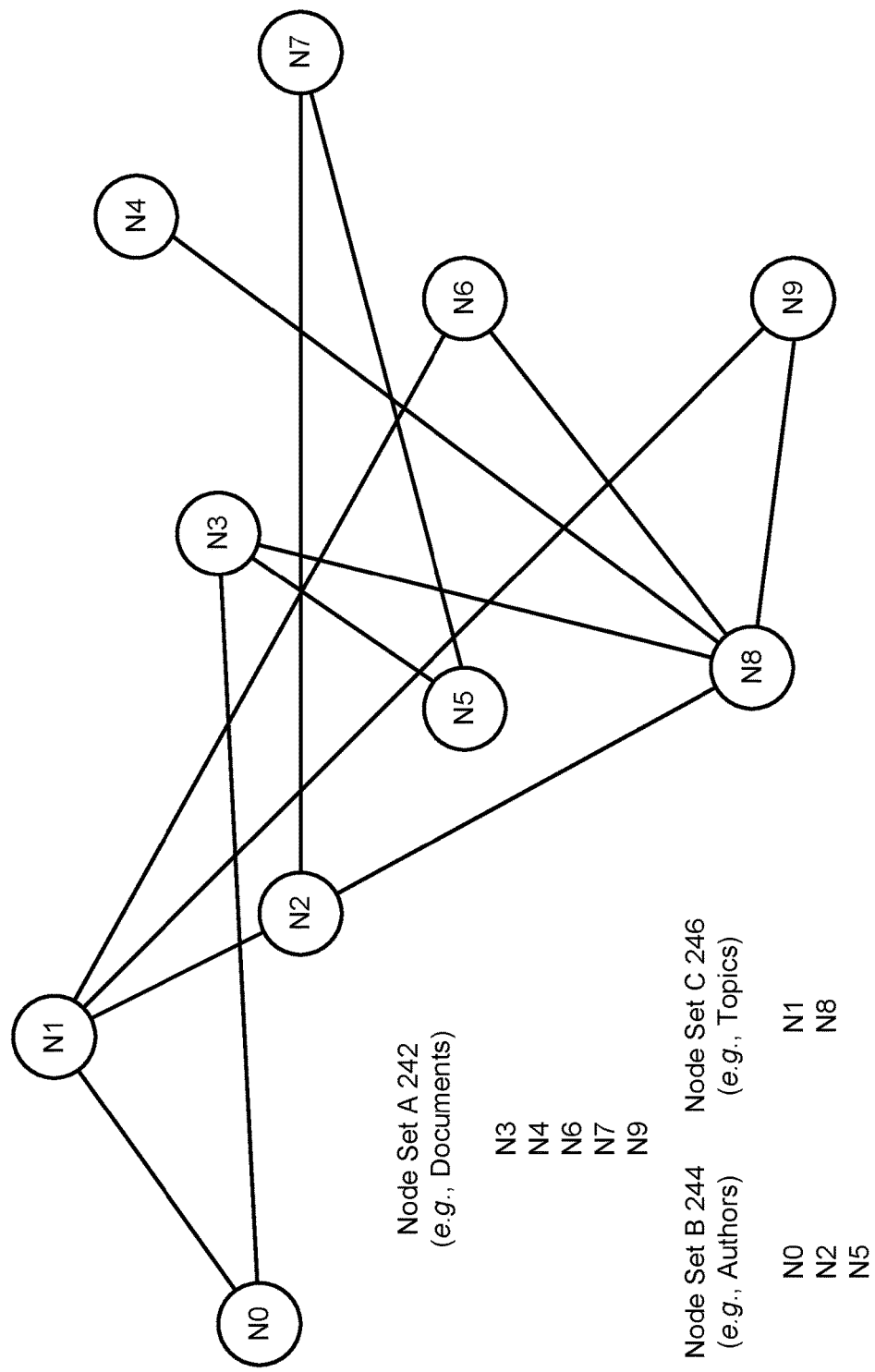

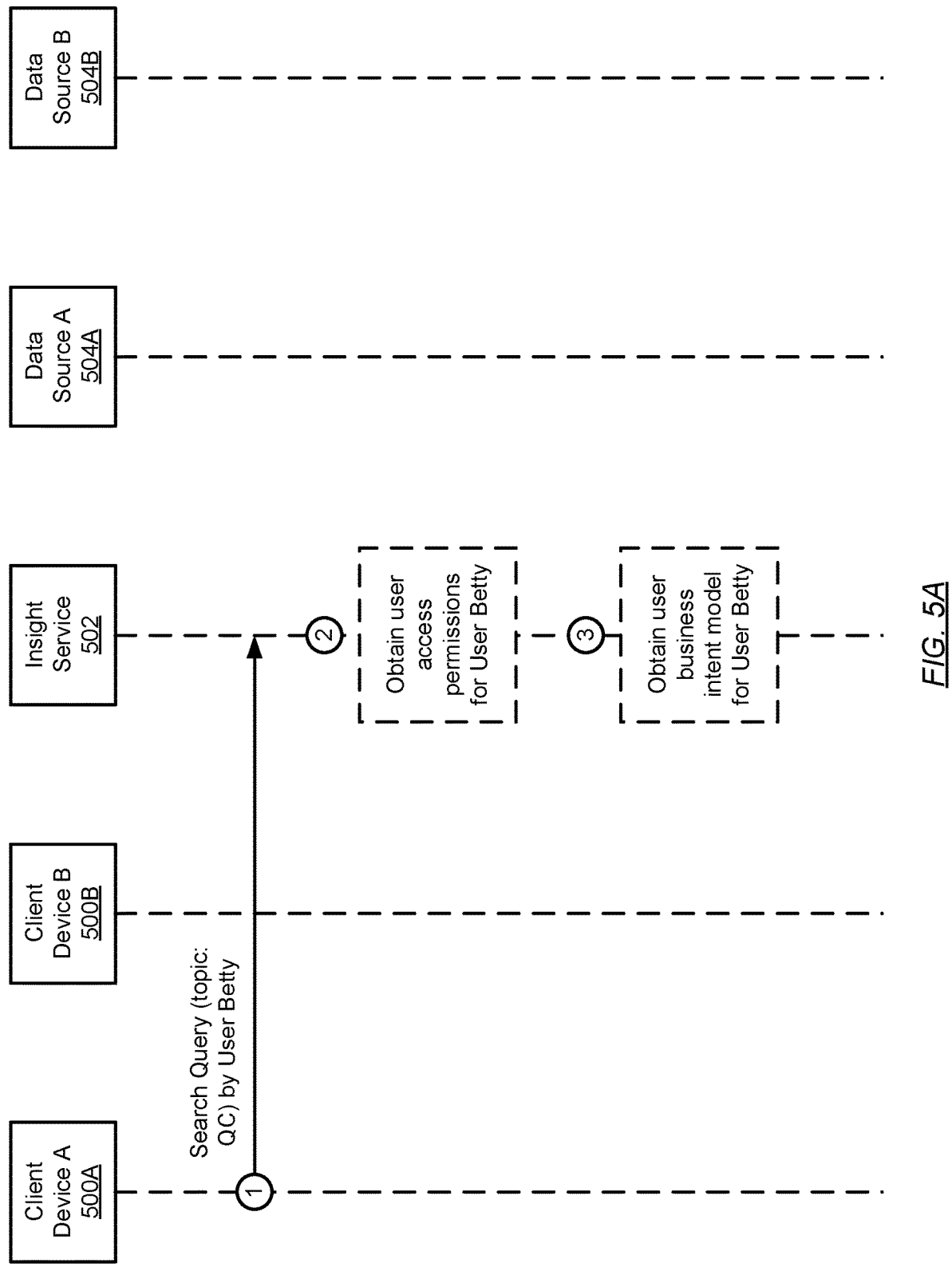

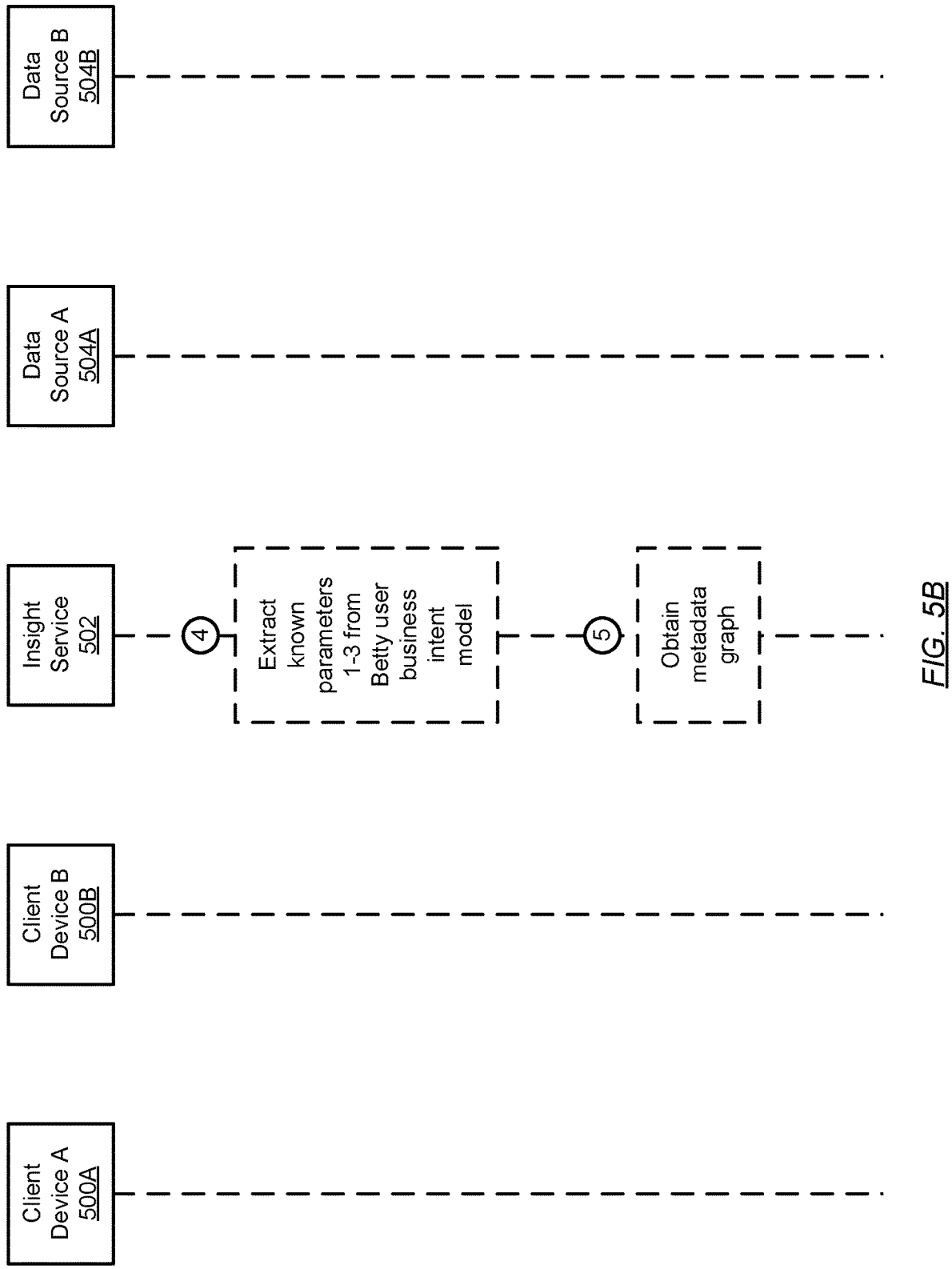

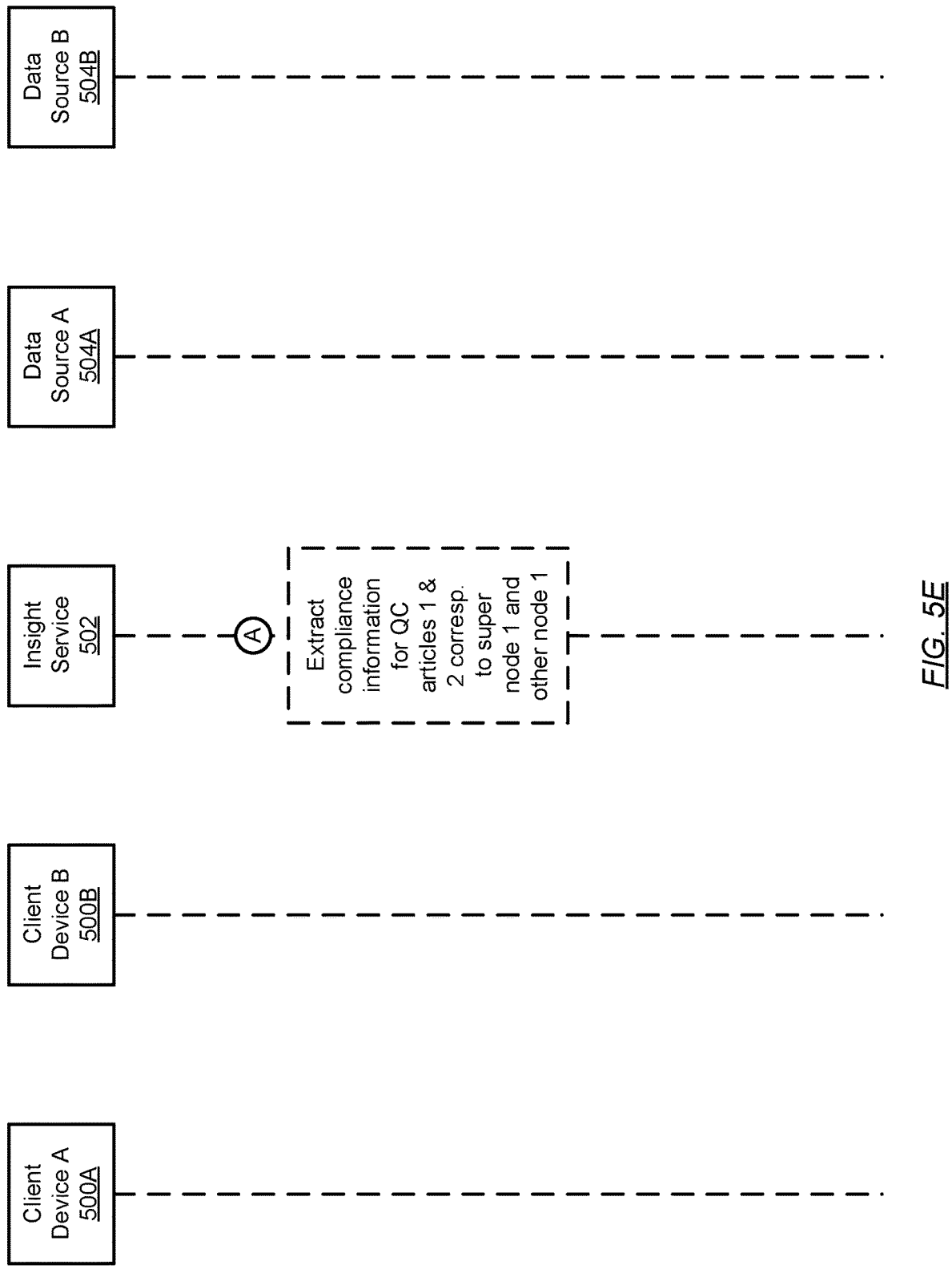

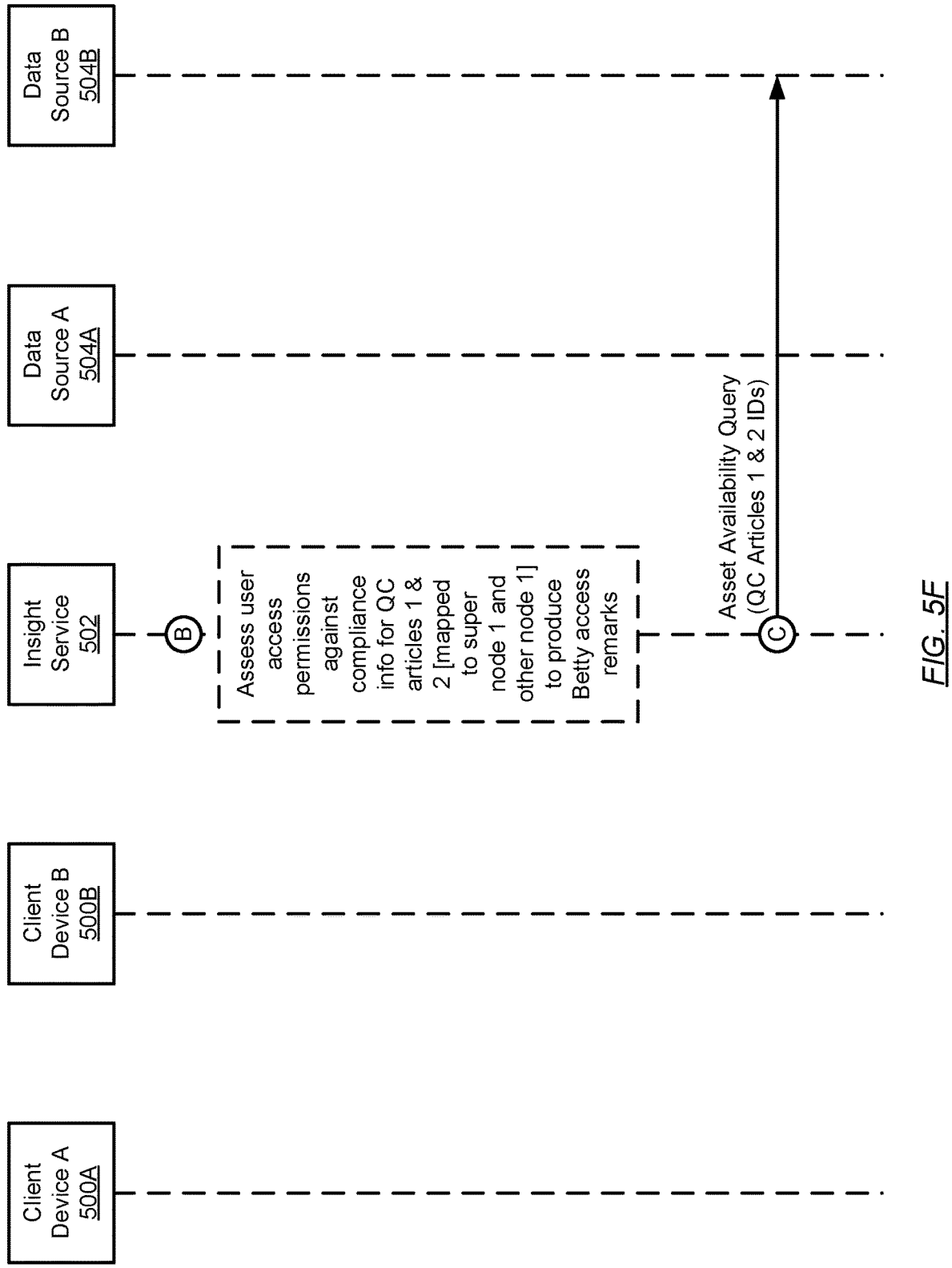

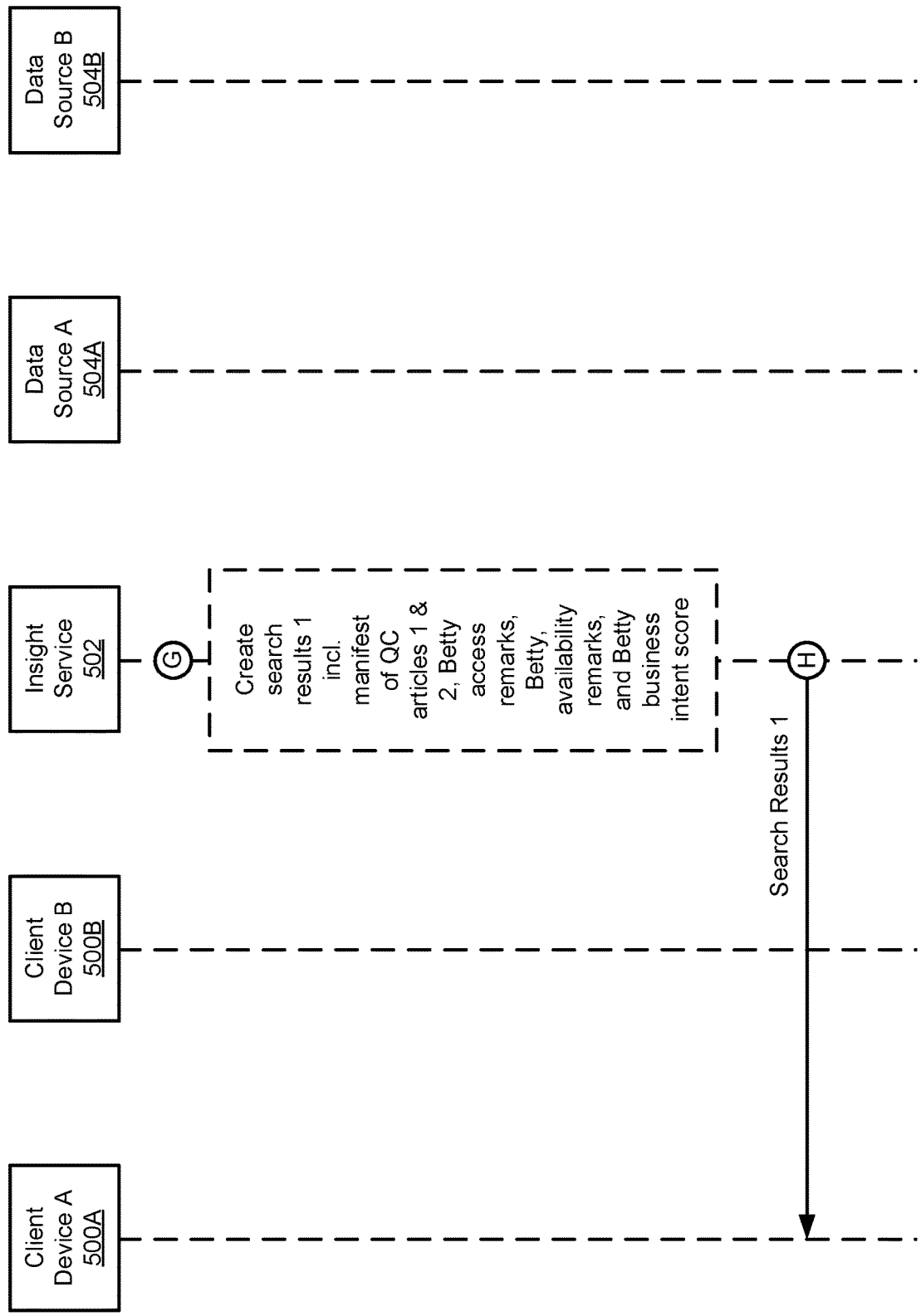

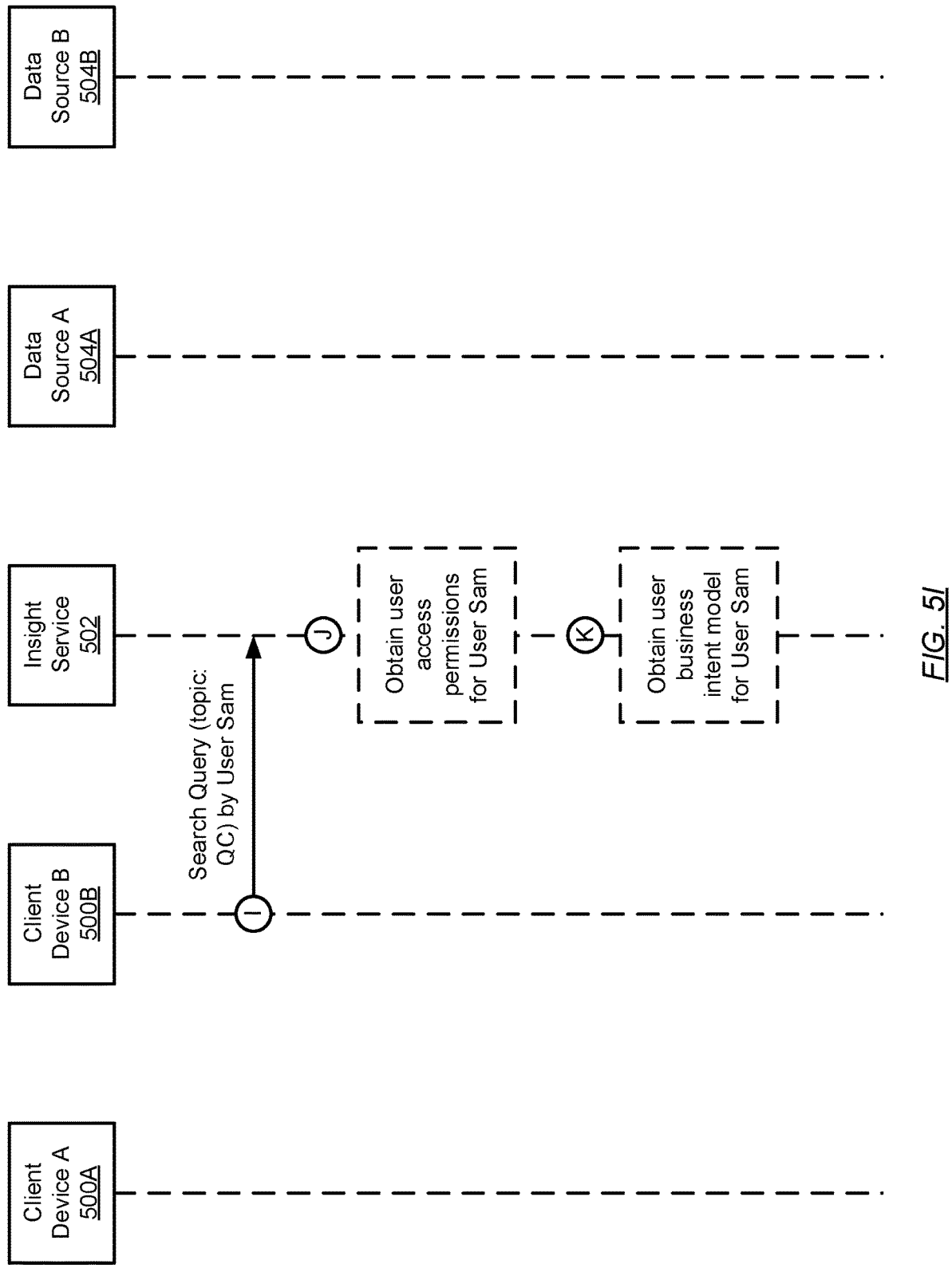

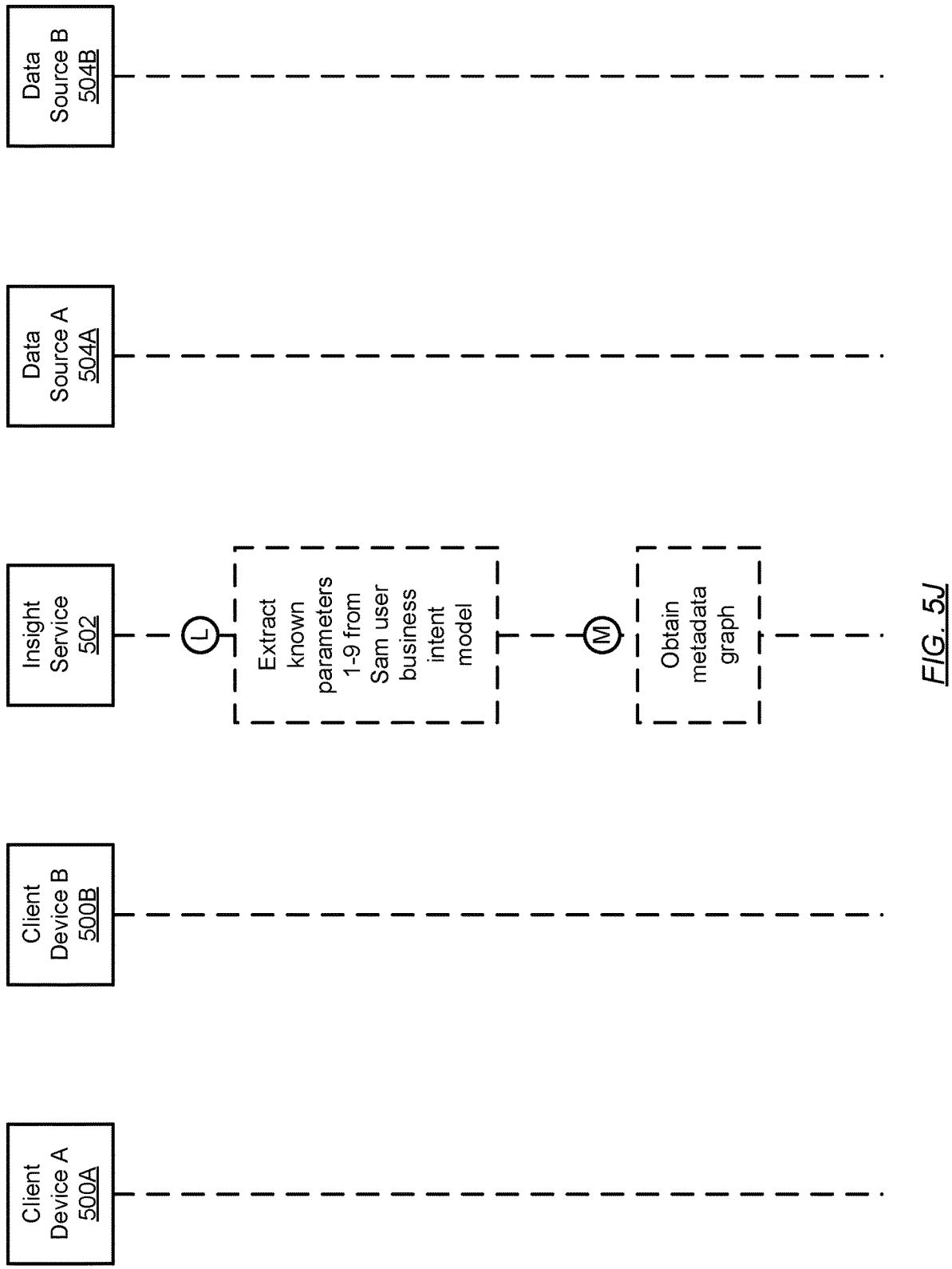

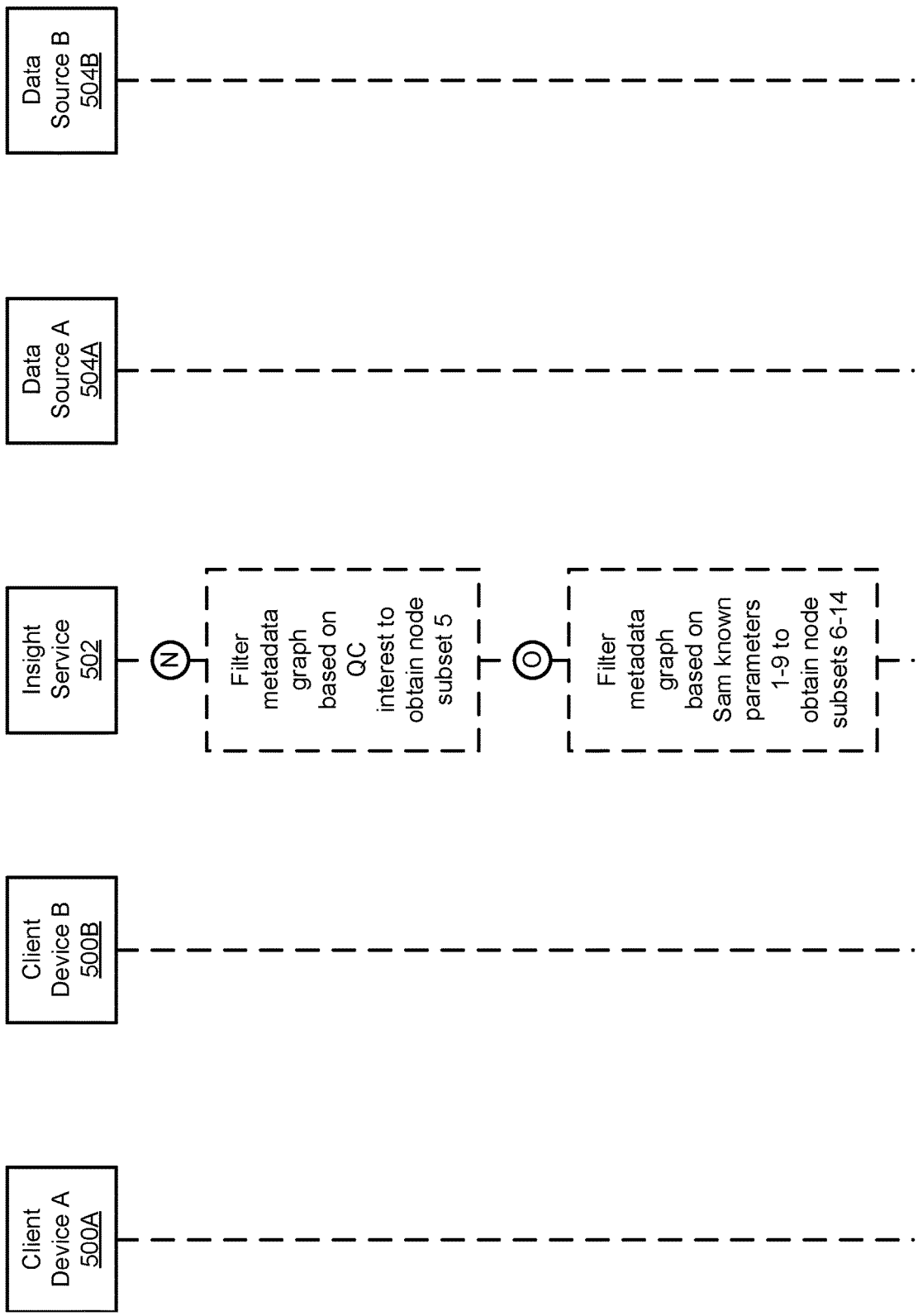

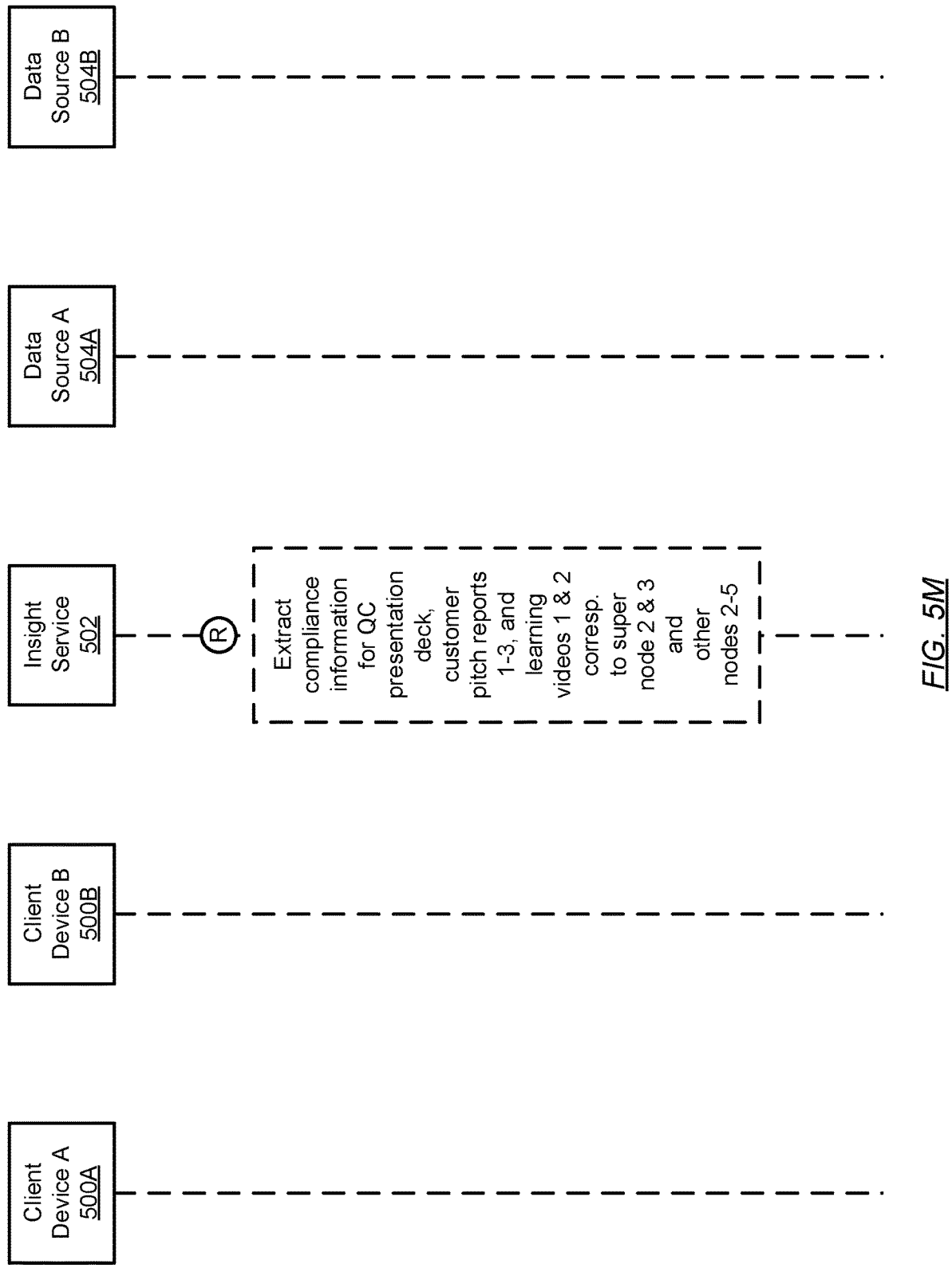

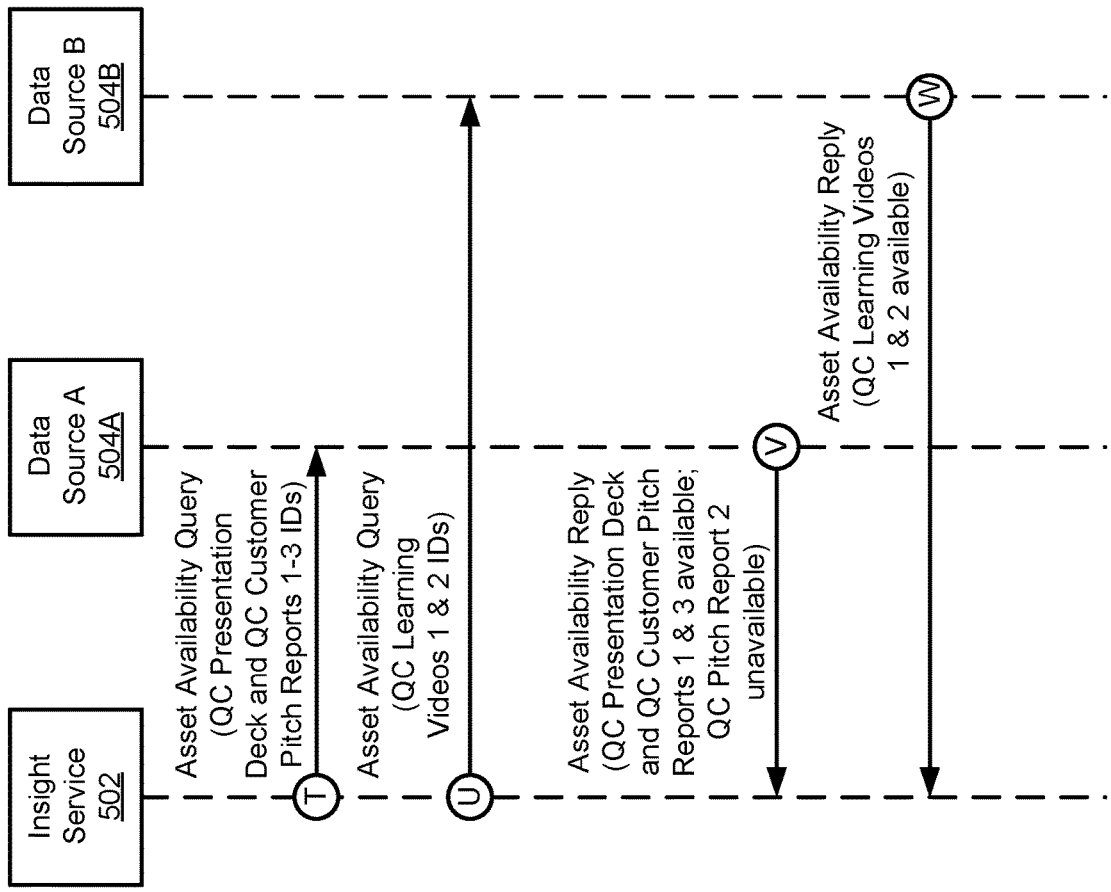

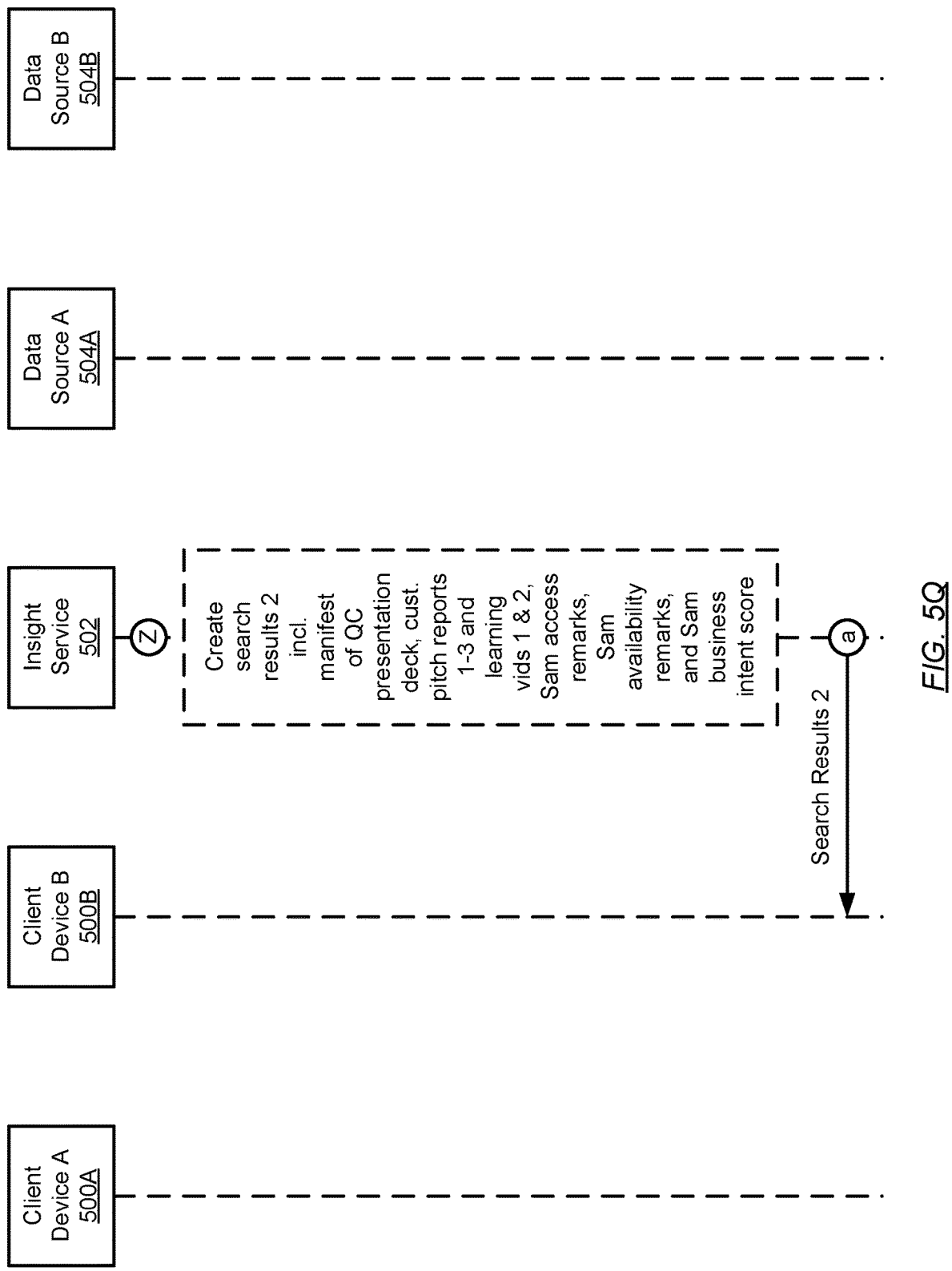

BUSINESS INTENT-ASSISTED SEARCH

BACKGROUND

Organization strategy may reference a plan (or a sum of actions), intended to be pursued by an organization, directed to leveraging organization resources towards achieving one or more long-term goals. Said long-term goal(s) may, for example, relate to identifying or predicting future or emergent trends across one or more industries. Digitally-assisted organization strategy, meanwhile, references the scheming and/or implementation of organization strategy, at least in part, through insights distilled by artificial intelligence.

SUMMARY

In general, in one aspect, embodiments disclosed herein relate to a method for processing search queries. The method includes: receiving a search query including a search topic; obtaining a metadata graph representative of an asset catalog; filtering, based on the search topic, the metadata graph to identify a first node subset; filtering, based on a set of known business intent parameters, the metadata graph to identify a set of second node subsets; generating a k-partite metadata graph using the first node subset and the set of second node subsets; and creating search results based on the k-partite metadata graph.

In general, in one aspect, embodiments disclosed herein relate to a non-transitory computer readable medium (CRM). The non-transitory CRM includes computer readable program code, which when executed by a computer processor, enables the computer processor to perform a method for processing search queries. The method includes: receiving a search query including a search topic; obtaining a metadata graph representative of an asset catalog; filtering, based on the search topic, the metadata graph to identify a first node subset; filtering, based on a set of known business intent parameters, the metadata graph to identify a set of second node subsets; generating a k-partite metadata graph using the first node subset and the set of second node subsets; and creating search results based on the k-partite metadata graph.

In general, in one aspect, embodiments disclosed herein relate to a system. The system includes: a client device; and an insight service operatively connected to the client device, and including a computer processor configured to perform a method for processing search queries. The method includes: receiving, from the client device, a search query comprising a search topic; obtaining a metadata graph representative of an asset catalog; filtering, based on the search topic, the metadata graph to identify a first node subset; filtering, based on a set of known business intent parameters, the metadata graph to identify a set of second node subsets; generating a k-partite metadata graph using the first node subset and the set of second node subsets; and creating search results based on the k-partite metadata graph.

Other aspects disclosed herein will be apparent from the following description and the appended claims.

BRIEF DESCRIPTION OF DRAWINGS

FIGS. 2B-2D show example k-partite connected graphs in accordance with one or more embodiments disclosed herein.

DETAILED DESCRIPTION

Specific embodiments disclosed herein will now be described in detail with reference to the accompanying figures. In the following detailed description of the embodiments disclosed herein, numerous specific details are set forth in order to provide a more thorough understanding disclosed herein. However, it will be apparent to one of ordinary skill in the art that the embodiments disclosed herein may be practiced without these specific details. In other instances, well-known features have not been described in detail to avoid unnecessarily complicating the description.

In the following description of FIGS. 1A-5Q, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and a first element may encompass more than one element and succeed (or precede) the second element in an ordering of elements.

In general, embodiments disclosed herein relate to business intent-assisted search. A business intent may generally refer to information, respective to an organization user, which may pertain to or describe the engagement of the organization user within and/or outside their organization (e.g., a commercial business, an education institution, etc.). Embodiments disclosed herein, accordingly, implement search query processing based on the business intent modeled for the search query submitter (e.g., an organization user). Further, a recall of any returned information, relevant to the search query, may be contingent on and/or directly correlated with a completeness of the modeled business intent for any given organization user.

Figure 1A:
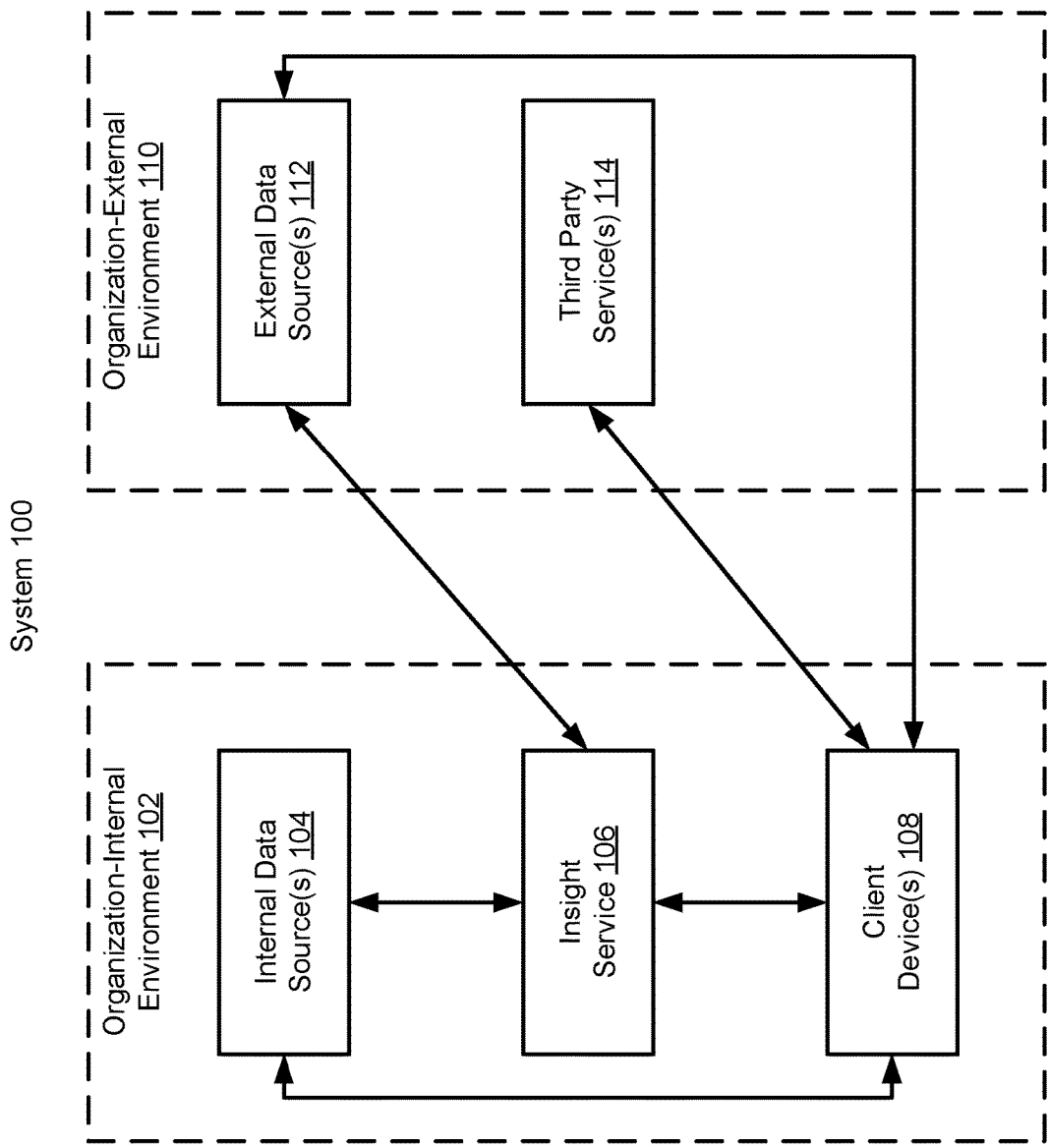
FIG. 1A shows a system in accordance with one or more embodiments disclosed herein.

FIG. 1A shows a system in accordance with one or more embodiments disclosed herein. The system (100) may include an organization-internal environment (102) and an organization-external environment (110). Each of these system (100) components is described below.

In one or many embodiment(s) disclosed herein, the organization-internal environment (102) may represent any digital (e.g., information technology (IT)) ecosystem belonging to, and thus managed by, an organization. Examples of said organization may include, but are not limited to, a business/commercial entity, a higher education school, a government agency, and a research institute. The organization-internal environment (102), accordingly, may at least reference one or more data centers of which the organization is the proprietor. Further, the organization-internal environment (102) may include one or more internal data sources (104), an insight service (106), and one or more client devices (108). Each of these organization-internal environment (102) subcomponents may or may not be co-located, and thus reside and/or operate, in the same physical or geographical space. Moreover, each of these organization-internal environment (102) subcomponents is described below.

In one or many embodiment(s) disclosed herein, an internal data source (104) may represent any data source belonging to, and thus managed by, the above-mentioned organization. A data source, in turn, may generally refer to a location where data or information (also referred to herein as one or more assets) resides. An asset, accordingly, may be exemplified through structured data/information (e.g., tabular data/information or a dataset) or through unstructured data/information (e.g., text, an image, audio, a video, an animation, multimedia, etc.). Furthermore, any internal data source (104), more specially, may refer to a location that stores at least a portion of the asset(s) generated, modified, or otherwise interacted with, solely by entities (e.g., the insight service (106) and/or the client device(s) (108)) within the organization-internal environment (102). Entities outside the organization-internal environment may not be permitted to access any internal data source (104) and, therefore, may not be permitted to access any asset(s) maintained therein.

Moreover, in one or many embodiment(s) disclosed herein, any internal data source (104) may be implemented as physical storage (and/or as logical/virtual storage spanning at least a portion of the physical storage). The physical storage may, at least in part, include persistent storage, where examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one or many embodiment(s) disclosed herein, the insight service (106) may represent information technology infrastructure configured for digitally-assisted organization strategy. In brief, organization strategy may reference a plan (or a sum of actions), intended to be pursued by an organization, directed to leveraging organization resources towards achieving one or more long-term goals. Said long-term goal(s) may, for example, relate to identifying or predicting future or emergent trends across one or more industries. Digitally-assisted organization strategy, meanwhile, references the scheming and/or implementation of organization strategy, at least in part, through insights distilled by artificial intelligence. An insight, in turn, may be defined as a finding (or more broadly, as useful knowledge) gained through data analytics or, more precisely, through the discovery of patterns and/or relationships amongst an assortment of data/information (e.g., assets). The insight service (106), accordingly, may employ artificial intelligence to ingest assets maintained across various data sources (e.g., one or more internal data sources (104) and/or one or more external data sources (112)) and, subsequently, derive or infer insights therefrom that are supportive of an organization strategy for an organization.

In one or many embodiment(s) disclosed herein, the insight service (106) may be configured with various capabilities or functionalities directed to digitally-assisted organization strategy. Said capabilities/functionalities may include: business intent-assisted search, as described in FIGS. 3A and 3B as well as exemplified in FIGS. 5A-5Q, below. Further, the insight service (106) may perform other capabilities/functionalities without departing from the scope disclosed herein.

In one or many embodiment(s) disclosed herein, the insight service (106) may be implemented through on-premises infrastructure, cloud computing infrastructure, or any hybrid infrastructure thereof. The insight service (106), accordingly, may be implemented using one or more network servers (not shown), where each network server may represent a physical or a virtual network server. Additionally, or alternatively, the insight service (106) may be implemented using one or more computing systems each similar to the example computing system shown and described with respect to FIG. 4, below.

In one or many embodiment(s) disclosed herein, a client device (108) may represent any physical appliance or computing system operated by one or more organization users and configured to receive, generate, process, store, and/or transmit data/information (e.g., assets), as well as to provide an environment in which one or more computer programs (e.g., applications, insight agents, etc.) may execute thereon. An organization user, briefly, may refer to any individual whom is affiliated with, and fulfills one or more roles pertaining to, the organization that serves as the proprietor of the organization-internal environment (102). Further, in providing an execution environment for any computer programs, a client device (108) may include and allocate various resources (e.g., computer processors, memory, storage, virtualization, network bandwidth, etc.), as needed, to the computer programs and the tasks (or processes) instantiated thereby. Examples of a client device (108) may include, but are not limited to, a desktop computer, a laptop computer, a tablet computer, a smartphone, or any other computing system similar to the example computing system shown and described with respect to FIG. 4, below. Moreover, any client device (108) is described in further detail through FIG. 1B, below.

In one or many embodiment(s) disclosed herein, the organization-external environment (110) may represent any number of digital (e.g., IT) ecosystems not belonging to, and thus not managed by, an/the organization serving as the proprietor of the organization-internal environment (102). The organization-external environment (110), accordingly, may at least reference any public networks including any respective service(s) and data/information (e.g., assets). Further, the organization-external environment (110) may include one or more external data sources (112) and one or more third-party services (114). Each of these organization-external environment (110) subcomponents may or may not be co-located, and thus reside and/or operate, in the same physical or geographical space. Moreover, each of these organization-external environment (110) subcomponents is described below.

In one or many embodiment(s) disclosed herein, an external data source (112) may represent any data source (described above) not belonging to, and thus not managed by, an/the organization serving as the proprietor of the organization-internal environment (102). Any external data source (112), more specially, may refer to a location that stores at least a portion of the asset(s) found across any public networks. Further, depending on their respective access permissions, entities within the organization-internal environment (102), as well as those throughout the organization-external environment (110), may or may not be permitted to access any external data source (104) and, therefore, may or may not be permitted to access any asset(s) maintained therein.

Moreover, in one or many embodiment(s) disclosed herein, any external data source (112) may be implemented as physical storage (and/or as logical/virtual storage spanning at least a portion of the physical storage). The physical storage may, at least in part, include persistent storage, where examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one or many embodiment(s) disclosed herein, a third party service (114) may represent information technology infrastructure configured for any number of purposes and/or applications. A third party, whom may implement and manage one or more third party services (114), may refer to an individual, a group of individuals, or another organization (i.e., not the organization serving as the proprietor of the organization-internal environment (102)) that serves as the proprietor of said third party service(s) (114). By way of an example, one such third party service (114), as disclosed herein may be exemplified by an automated machine learning (ML) service. A purpose of the automated ML service may be directed to automating the selection, composition, and parameterization of ML models. That is, more simply, the automated ML service may be configured to automatically identify one or more optimal ML algorithms from which one or more ML models may be constructed and fit to a submitted dataset in order to best achieve any given set of tasks. Further, any third party service (114) is not limited to the aforementioned specific example.

In one or many embodiment(s) disclosed herein, any third party service (114) may be implemented through on-premises infrastructure, cloud computing infrastructure, or any hybrid infrastructure thereof. Any third party service (114), accordingly, may be implemented using one or more network servers (not shown), where each network server may represent a physical or a virtual network server. Additionally, or alternatively, any third party service (114) may be implemented using one or more computing systems each similar to the example computing system shown and described with respect to FIG. 4, below.

In one or many embodiment(s) disclosed herein, the above-mentioned system (100) components, and their respective subcomponents, may communicate with one another through a network (not shown) (e.g., a local area network (LAN), a wide area network (WAN) such as the Internet, a mobile network, any other communication network type, or a combination thereof). The network may be implemented using any combination of wired and/or wireless connections. Further, the network may encompass various interconnected, network-enabled subcomponents (or systems) (e.g., switches, routers, gateways, etc.) that may facilitate communications between the above-mentioned system (100) components and their respective subcomponents. Moreover, in communicating with one another, the above-mentioned system (100) components, and their respective subcomponents, may employ any combination of existing wired and/or wireless communication protocols.

While FIG. 1A shows a configuration of components and/or subcomponents, other system (100) configurations may be used without departing from the scope disclosed herein.

Figure 1B:
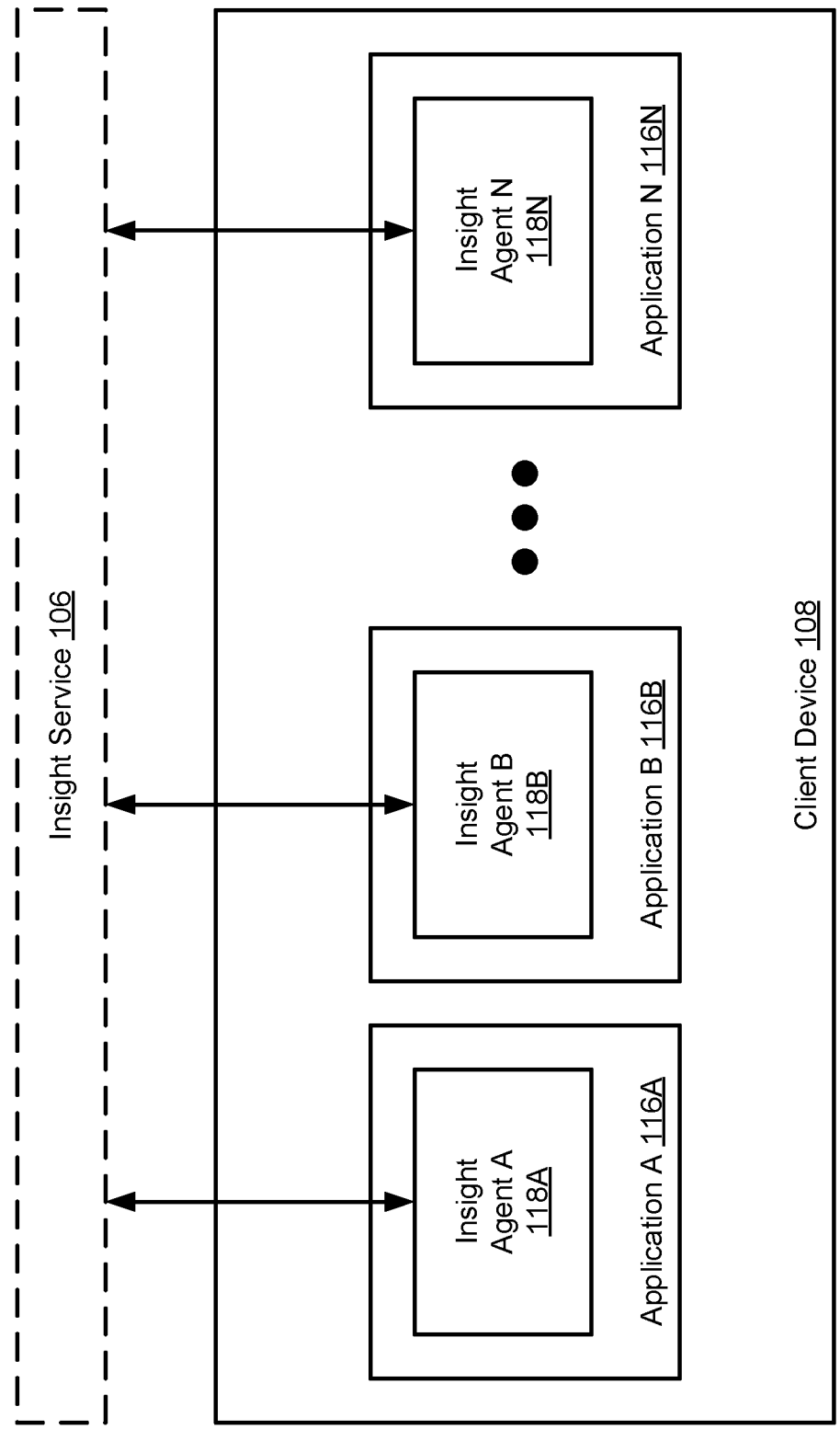
FIG. 1B shows a client device in accordance with one or more embodiments disclosed herein.

FIG. 1B shows a client device in accordance with one or more embodiments disclosed herein. The client device (108) (described above as well) (see e.g., FIG. 1A) may host or include one or more applications (116A-116N). Each application (116A-116N), in turn, may host or include an insight agent (118A-118N). Each of these client device (108) subcomponents is described below.

In one or many embodiment(s) disclosed herein, an application (116A-116N) (also referred to herein as a software application or program) may represent a computer program, or a collection of computer instructions, configured to perform one or more specific functions. Broadly, examples of said specific function(s) may include, but are not limited to, receiving, generating and/or modifying, processing and/or analyzing, storing or deleting, and transmitting data/information (e.g., assets) (or at least portions thereof). That is, said specific function(s) may generally entail one or more interactions with data/information either maintained locally on the client device (108) or remotely across one or more data sources. Examples of an application (116A-116N) may include a word processor, a spreadsheet editor, a presentation editor, a database manager, a graphics renderer, a video editor, an audio editor, a web browser, a collaboration tool or platform, and an electronic mail (or email) client. Any application (116A-116N), further, is not limited to the aforementioned specific examples.

In one or many embodiment(s) disclosed herein, any application (116A-116N) may be employed by one or more organization users, which may be operating the client device (108), to achieve one or more tasks, at least in part, contingent on the specific function(s) that the application (116A-116N) may be configured to perform. Said task(s) may or may not be directed to supporting and/or achieving any short-term and/or long-term goal(s) outlined by an/the organization with which the organization user(s) may be affiliated.

In one or many embodiment(s) disclosed herein, an insight agent (118A-118N) may represent a computer program, or a collection of computer instructions, configured to perform any number of tasks in support, or as extensions, of the capabilities or functionalities of the insight service (106) (described above) (see e.g., FIG. 1A). With respect to their assigned application (116A-116N), examples of said tasks, which may be carried out by a given insight agent (118A-118N), may include: detecting an initiation of their assigned application (116A-116N) by the organization user(s) operating the client device (108); monitoring any engagement (or interaction), by the organization user(s), with their assigned application (116A-116N) following the detected initiation thereof; identifying certain engagement/interaction actions, performed by the organization user(s), based on said engagement/interaction monitoring; executing any number of procedures or algorithms, relevant to one or more insight service (106) capabilities/functionalities, in response to one or more of the identified certain engagement/interaction actions; providing periodic and/or on-demand telemetry to the insight service (106), where said telemetry may include, for example, data/information requiring processing or analysis to be performed on/by the insight service (106); and receive periodic and/or on-demand updates (and/or instructions) from the insight service (106). Further, the tasks carried out by any insight agent (118A-118N) are not limited to the aforementioned specific examples.

While FIG. 1B shows a configuration of components and/or subcomponents, other client device (108) configurations may be used without departing from the scope disclosed herein. For example, in one or many embodiment(s) disclosed herein, not all of the application(s) (116A-116N), executing on the client device (108), may host or include an insight agent (118A-118N). That is, in said embodiment(s), an insight agent (118A-118N) may not be assigned to or associated with any of at least a subset of the application(s) (116A-116N) installed on the client device (108).

Figure 2A:
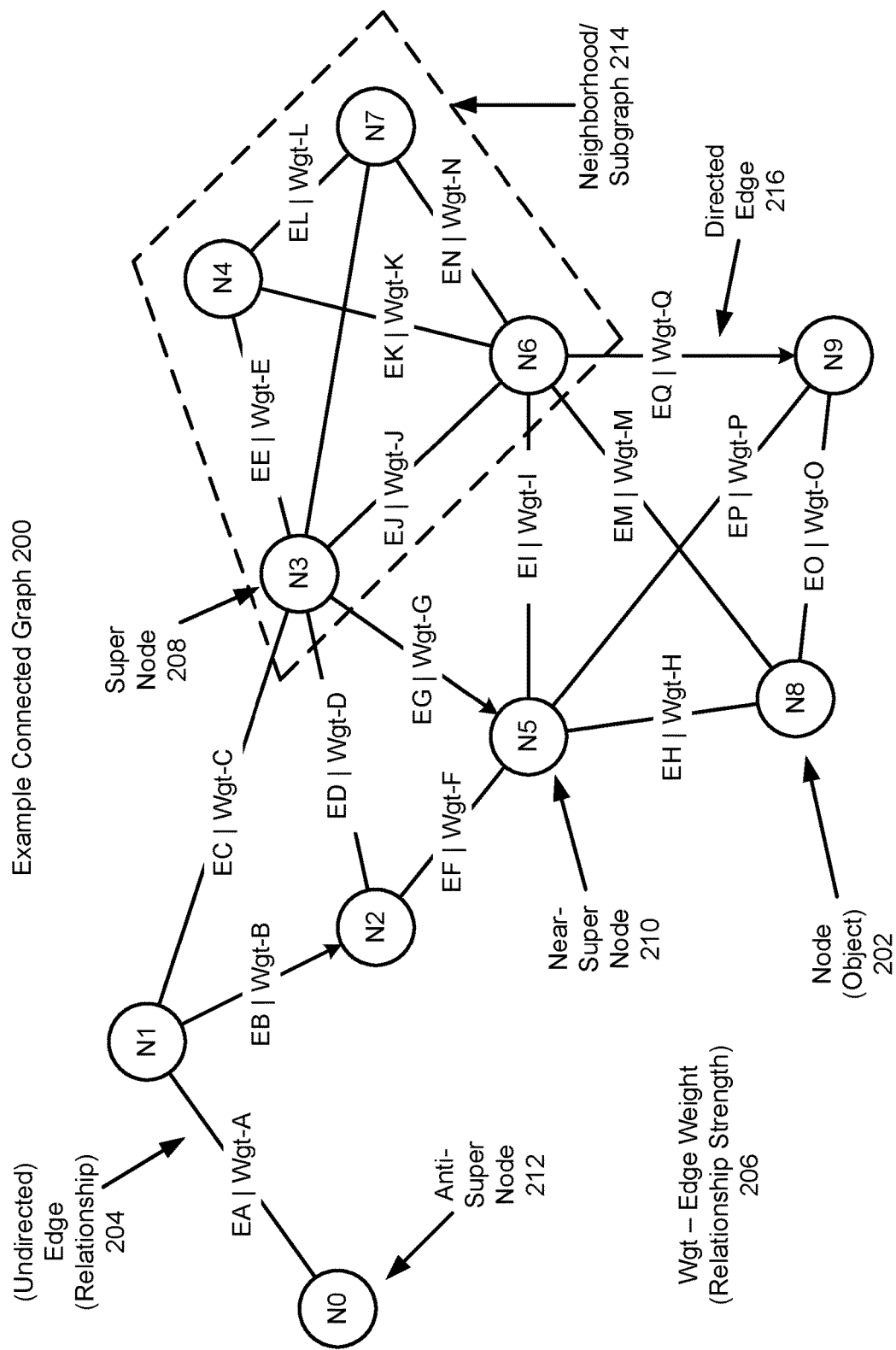
FIG. 2A shows an example connected graph in accordance with one or more embodiments disclosed herein.

FIG. 2A shows an example connected graph in accordance with one or more embodiments disclosed herein. A connected graph (200), as disclosed herein, may refer to a set of nodes (202) (denoted in the example by the circles labeled N0, N1, N2, . . . , N9) interconnected by a set of edges (204, 216) (denoted in the example by the lines labeled EA, EB, EC, . . . , EQ between pairs of nodes). Each node (202) may represent or correspond to an object (e.g., a catalog entry, a record, specific data/information, a person, etc.) whereas each edge (204, 216), between or connecting any pair of nodes, may represent or correspond to a relationship, or relationships, associating the objects mapped to the pair of nodes. A connected graph (200), accordingly, may reference a data structure that reflects associations amongst any number, or a collection, of objects.

In one or many embodiment(s) disclosed herein, each node (202), in a connected graph (200), may also be referred to herein, and thus may serve, as an endpoint (of a pair of endpoints) of/to at least one edge (204). Further, based on a number of edges connected thereto, any node (202), in a connected graph (200), may be designated or identified as a super node (208), a near-super node (210), or an anti-super node (212). A super node (208) may reference any node where the number of edges, connected thereto, meets or exceeds a (high) threshold number of edges (e.g., six (6) edges). A near-super node (210), meanwhile, may reference any node where the number of edges, connected thereto, meets or exceeds a first (high) threshold number of edges (e.g., five (5) edges) yet lies below a second (higher) threshold number of edges (e.g., six (6) edges), where said second threshold number of edges defines the criterion for designating/identifying a super node (208). Lastly, an anti-super node (212) may reference any node where the number of edges, connected thereto, lies below a (low) threshold number of edges (e.g., two (2) edges).

In one or many embodiment(s) disclosed herein, each edge (204, 216), in a connected graph (200), may either be designated or identified as an undirected edge (204) or, conversely, as a directed edge (216). An undirected edge (204) may reference any edge specifying a bidirectional relationship between objects mapped to the pair of endpoints (i.e., pair of nodes (202)) connected by the edge. A directed edge (216), on the other hand, may reference any edge specifying a unidirectional relationship between objects mapped to the pair of endpoints connected by the edge.

In one or many embodiment(s) disclosed herein, each edge (204, 216), in a connected graph (200), may be associated with or assigned an edge weight (206) (denoted in the example by the labels Wgt-A, Wgt-B, Wgt-C, . . . , Wgt-Q). An edge weight (206), of a given edge (204, 216), may reflect a strength of the relationship(s) represented by the given edge (204, 216). Further, any edge weight (206) may be expressed as or through a positive numerical value within a predefined spectrum or range of positive numerical values (e.g., 0.1 to 1.0, 1 to 100, etc.). Moreover, across the said predefined spectrum/range of positive numerical values, higher positive numerical values may reflect stronger relationships, while lower positive numerical values may alternatively reflect weaker relationships.

In one or many embodiment(s) disclosed herein, based on an edge weight (206) associated with or assigned to an edge (204, 216) connected thereto, any node (202), in a connected graph (200), may be designated or identified as a strong adjacent node (not shown) or a weak adjacent node (not shown) with respect to the other endpoint of (i.e., the other node connected to the node (202) through) the edge (204, 216). That is, a strong adjacent node may reference any node of a pair of nodes connected by an edge, where an edge weight of the edge meets or exceeds a (high) edge weight threshold. Alternatively, a weak adjacent node may reference any node of a pair of nodes connected by an edge, where an edge weight of the edge lies below a (low) edge weight threshold.

In one or many embodiment(s) disclosed herein, a connected graph (200) may include one or more subgraphs (214) (also referred to as neighborhoods). A subgraph (214) may refer to a smaller connected graph found within a (larger) connected graph (200). A subgraph (214), accordingly, may include a node subset of the set of nodes (202), and an edge subset of the set of edges (204, 216), that form a connected graph (200), where the edge subset interconnects the node subset.

While FIG. 2A shows a configuration of components and/or subcomponents, other connected graph (200) configurations may be used without departing from the scope disclosed herein.

Figure 2B:
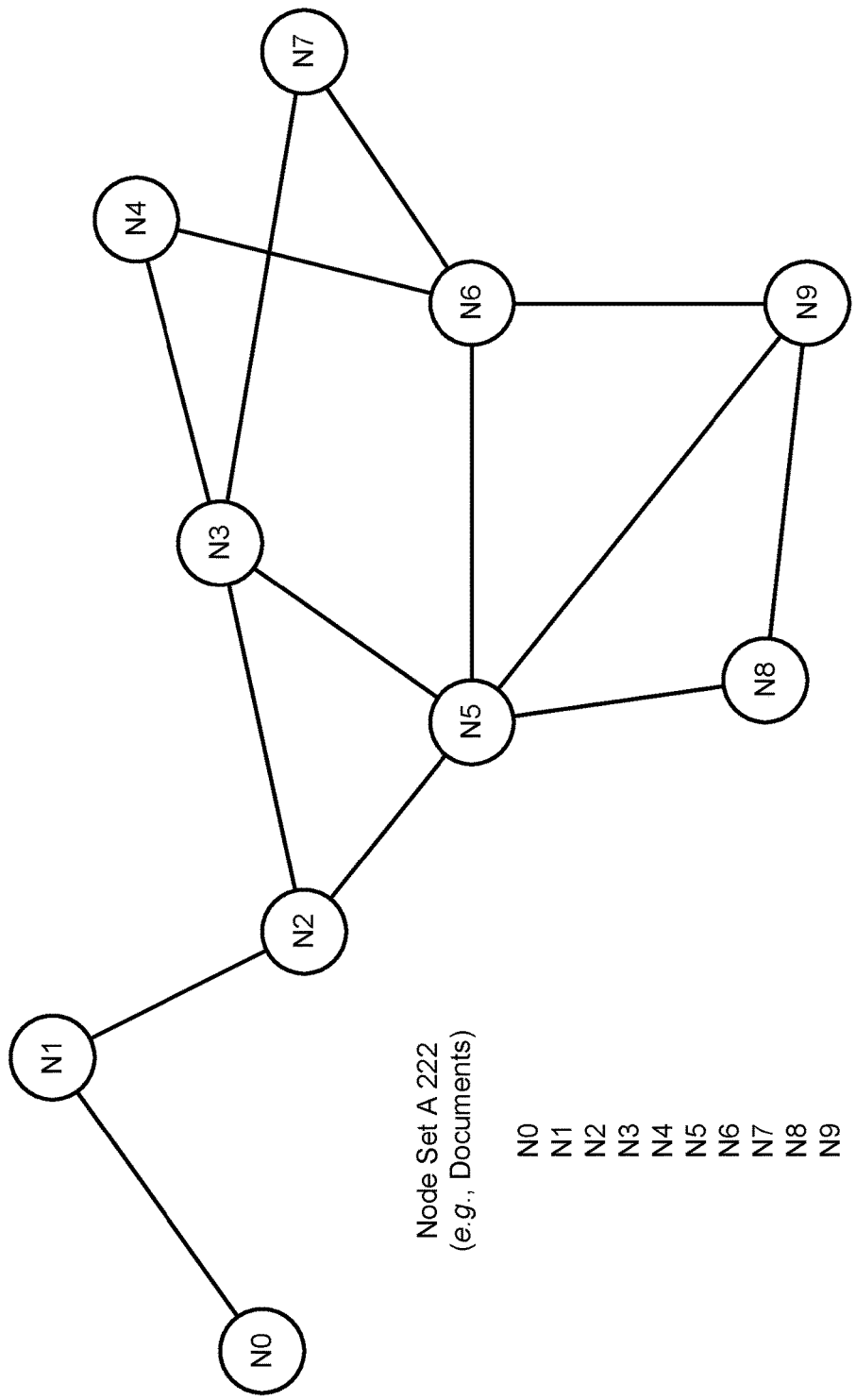
Figure 2C:
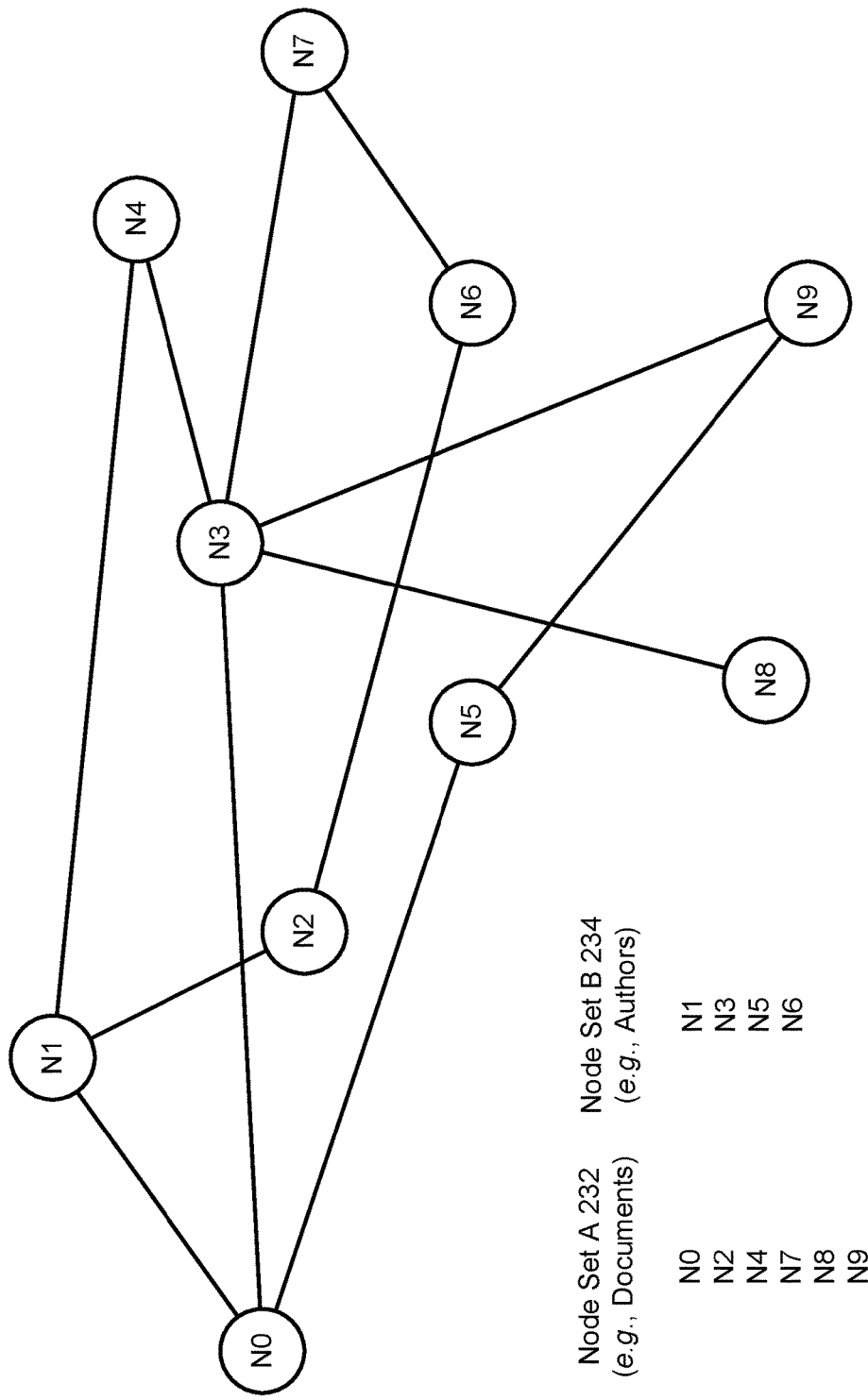

FIGS. 2B-2D show example k-partite connected graphs in accordance with one or more embodiments disclosed herein. Generally, any k-partite connected graph may represent a connected graph (described above) (see e.g., FIG. 2A) that encompasses k independent sets of nodes and a set of edges interconnecting (and thus defining relationships between) pairs of nodes: (a) both belonging to the same, single independent set of nodes in any (k=1)-partite connected graph; or (b) each belonging to a different independent set of nodes in any (k>1)-partite connected graph. Further, any k-partite connected graph, as disclosed herein, may fall into one of three possible classifications: (a) a uni-partite connected graph, where k=1; (b) a bi-partite connected graph, where k=2; or (c) a multi-partite connected graph, where k≥3.

Turning to FIG. 2B, an example uni-partite connected graph (220) is depicted. The uni-partite connected graph (220) includes one (k=1) independent set of nodes—i.e., a node set (222), which collectively maps or belongs to a single object class (e.g., documents).

Further, in the example, the node set is denoted by the circles labeled N0, N1, N2, . . . , N9. Each said circle, in the node set (222), subsequently denotes a node that represents or corresponds to a given object (e.g., a document) in a collection of objects (e.g., a group of documents) of the same object class (e.g., documents).

Moreover, the uni-partite connected graph (220) additionally includes a set of edges (denoted in the example by the lines interconnecting pairs of nodes, where the first and second nodes in a given node pair belongs to the node set (222)). Each edge, in the example, thus reflects a relationship, or relationships, between any two nodes of the node set (222) (and, by association, any two objects of the same object class) directly connected via the edge.

Turning to FIG. 2C, an example bi-partite connected graph (230) is depicted. The bi-partite connected graph (230) includes two (k=2) independent sets of nodes—i.e., a first node set (232) and a second node set (234), where the former collectively maps or belongs to a first object class (e.g., documents) whereas the latter collectively maps or belongs to a second object class (e.g., authors).

Further, in the example, the first node set (232) is denoted by the circles labeled N0, N2, N4, N7, N8, and N9, while the second node set (234) is denoted by the circles labeled N1, N3, N5, and N6. Each circle, in the first node set (232), subsequently denotes a node that represents or corresponds to a given first object (e.g., a document) in a collection of first objects (e.g., a group of documents) of the first object class (e.g., documents). Meanwhile, each circle, in the second node set (234), subsequently denotes a node that represents or corresponds to a given second object (e.g., an author) in a collection of second objects (e.g., a group of authors) of the second object class (e.g., authors).

Moreover, the bi-partite connected graph (230) additionally includes a set of edges (denoted in the example by the lines interconnecting pairs of nodes, where a first node in a given node pair belongs to the first node set (232) and a second node in the given node pair belongs to the second node set (234)). Each edge, in the example, thus reflects a relationship, or relationships, between any one node of the first node set (232) and any one node of the second node set (234) (and, by association, any one object of the first object class and any one object of the second object class) directly connected via the edge.

Turning to FIG. 2D, an example multi-partite connected graph (240) is depicted. The multi-partite connected graph (240) includes three (k=3) independent sets of nodes—i.e., a first node set (242), a second node set (244), and a third node set (246). The first node set (242) collectively maps or belongs to a first object class (e.g., documents); the second node set (244) collectively maps or belongs to a second object class (e.g., authors); and the third node set (246) collectively maps or belongs to a third object class (e.g., topics).

Further, in the example, the first node set (242) is denoted by the circles labeled N3, N4, N6, N7, and N9; the second node set (244) is denoted by the circles labeled N0, N2, and N5; and the third node set (246) is denoted by the circles labeled N1 and N8. Each circle, in the first node set (242), subsequently denotes a node that represents or corresponds to a given first object (e.g., a document) in a collection of first objects (e.g., a group of documents) of the first object class (e.g., documents). Meanwhile, each circle, in the second node set (244), subsequently denotes a node that represents or corresponds to a given second object (e.g., an author) in a collection of second objects (e.g., a group of authors) of the second object class (e.g., authors). Lastly, each circle, in the third node set (246), subsequently denotes a node that represents or corresponds to a given third object (e.g., a topic) in a collection of third objects (e.g., a group of topics) of the third object class (e.g., topics).

Moreover, the multi-partite connected graph (240) additionally includes a set of edges (denoted in the example by the lines interconnecting pairs of nodes, where a first node in a given node pair belongs to one object class from the three available object classes, and a second node in the given node pair belongs to another object class from the two remaining object classes (that excludes the one object class to which the first node in the given node pair belongs)). Each edge, in the example, thus reflects a relationship, or relationships, between any one node of one object class (from the three available object classes) and any one node of another object class (from the two remaining object class excluding the one object class) directly connected via the edge.

Figure 3A:
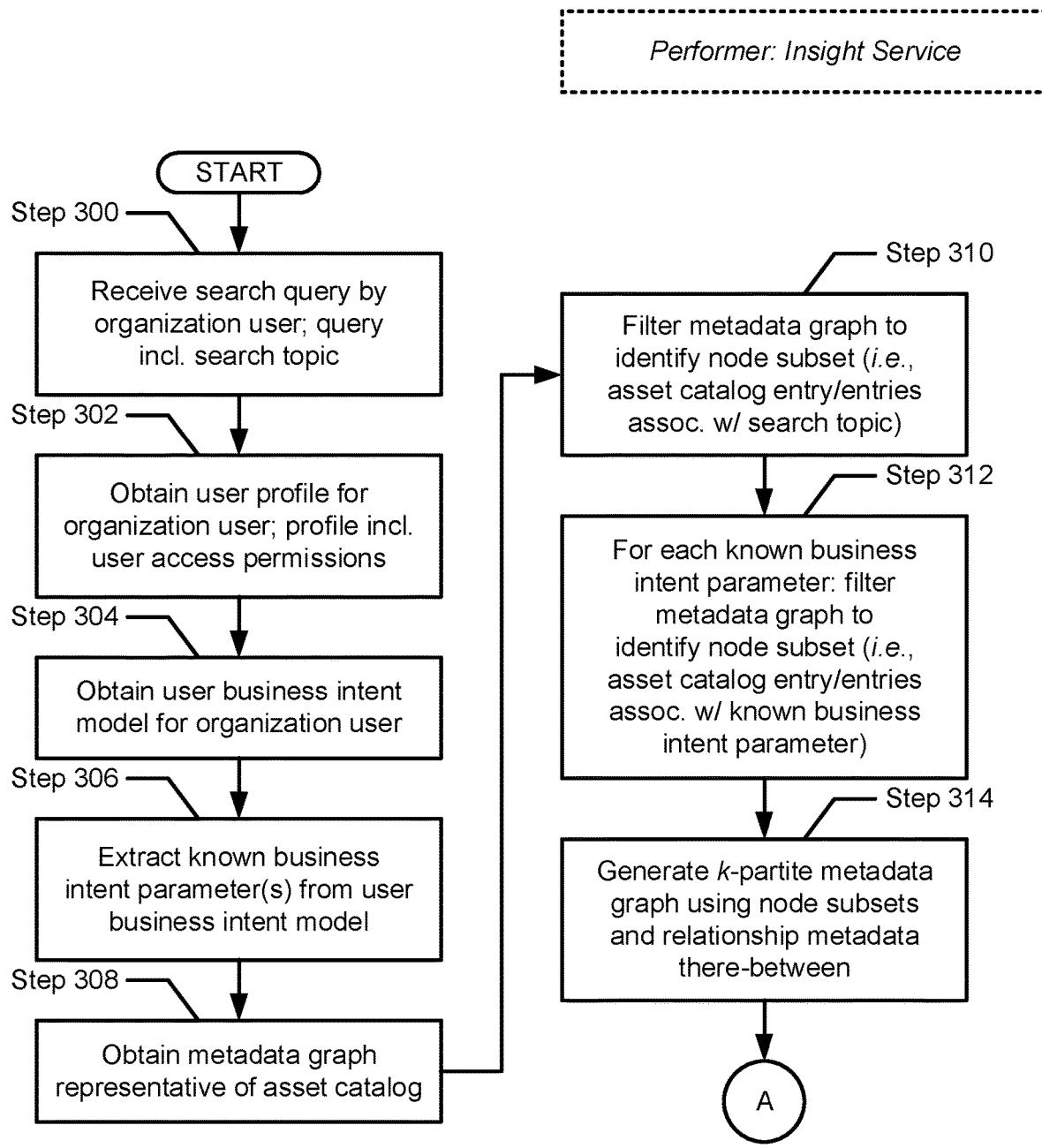
FIGS. 3A and 3B show flowcharts describing a method for business intent-assisted search in accordance with one or more embodiments disclosed herein.
Figure 3B:
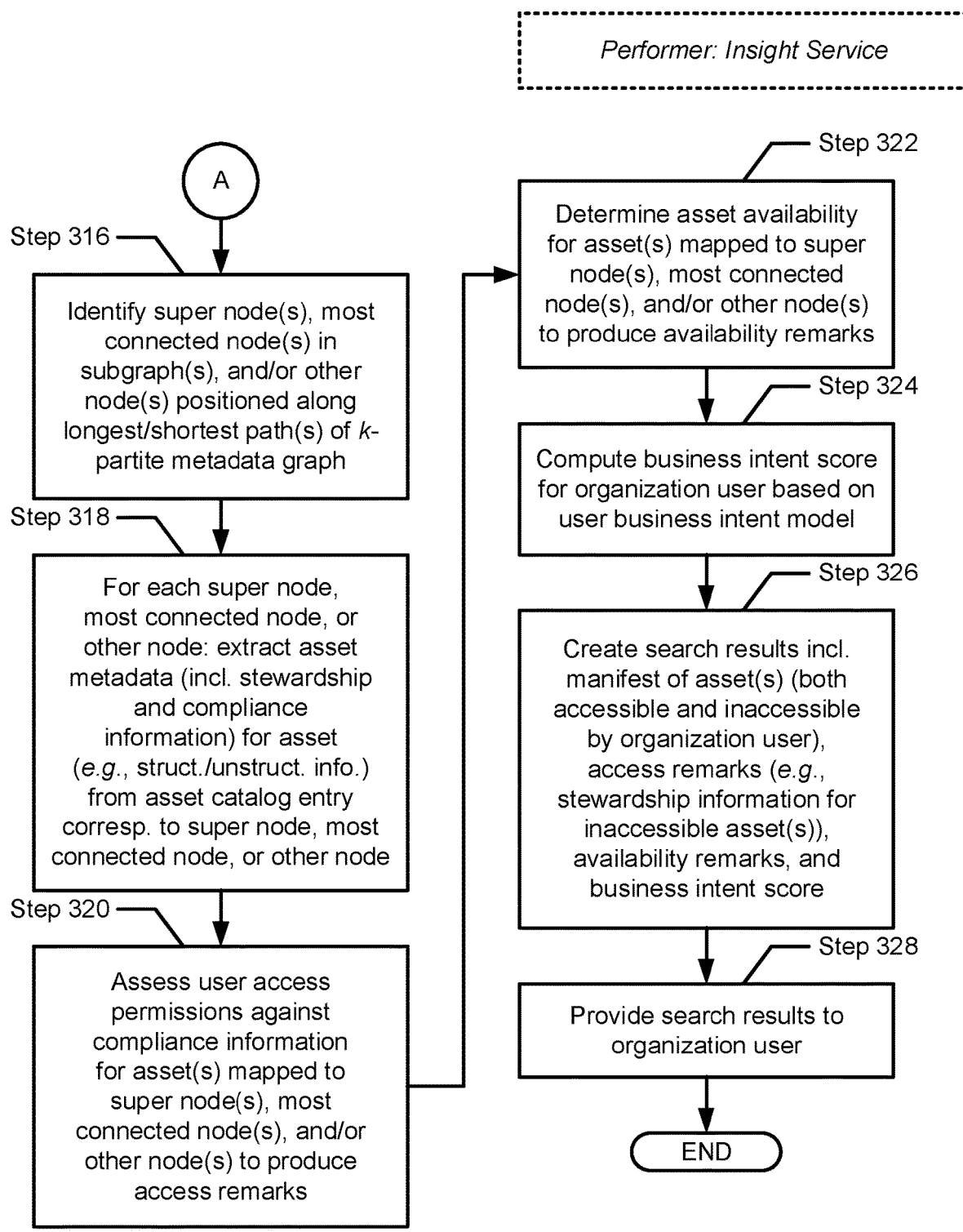

FIGS. 3A and 3B show flowcharts describing a method for business intent-assisted search in accordance with one or more embodiments disclosed herein. The various steps outlined below may be performed by an insight service (see e.g., FIG. 1). Further, while the various steps in the flowchart are presented and described sequentially, one of ordinary skill will appreciate that some or all steps may be executed in different orders, may be combined or omitted, and some or all steps may be executed in parallel.

Turning to FIG. 3A, in Step 300, a search query is received. In one or many embodiment(s) disclosed herein, the search query may include or specify a search topic. The search topic may refer to a subject or domain to which sought information may belong or may be associated with. Further, the search query may have been submitted by an organization user. As such, the search query may represent an inquiry, by the organization user, with regards to known or catalogued assets (e.g., any existing forms of structured and/or unstructured information) concerning the specified search topic.

In Step 302, a user profile is obtained. In one or many embodiment(s) disclosed herein, the user profile may pertain to the organization user (from which the search query had been received in Step 300). The user profile may refer to a collection of settings and information associated with the organization user. As such, the user profile may include, but is not limited to, user access permissions.

In one or many embodiment(s) disclosed herein, the user access permissions may reflect the level of authorization granted to the organization user for accessing specific resources. The granted level of authorization, for any given organization user, may, for example, be contingent on any number of factors, which may include, but is/are not limited to: one or more user organization roles (e.g., title(s) and/or position(s)) within an organization that may be associated with the given organization user; one or more organization responsibilities (e.g., assigned project(s) or task(s)) within an organization that may be associated with the given organization user; a client device (and the security hygiene or characteristics thereof) operated by the given organization user; and a geographical location where the given organization user may be physically situated. The factor(s) affecting the user access permissions for any given organization user is/are not limited to the aforementioned specific examples.

In Step 304, a user business intent model, for the organization user, is obtained. In one or many embodiment(s) disclosed herein, the user business intent model may refer to a data model (or an abstract representation) of the known business intent thus far captured for the organization user. Business intent, in turn, may generally refer to information, respective to the organization user, which may pertain to or describe the engagement of the organization user within and/or outside their organization (e.g., a commercial business, an education institution, etc.).

Further, in one or many embodiment(s) disclosed herein, business intent, and thus any user business intent model, may be represented through a set of business intent parameters. Examples of said business intent parameter(s) (as they pertain to any given organization user) may include, but is/are not limited to: one or more user organization roles (e.g., title(s) and/or position(s)) within an organization that may be associated with the given organization user; one or more other organization users within the organization with which the given organization user interacts and/or had interacted; one or more suppliers, distributors, customers, collaborators, and/or other actors outside the organization (also collectively referred to herein as one or more value networks) with which the given organization user interacts and/or had interacted; a search query history reflecting one or more past search queries, as well as the search topic(s) entailed, which had been previously submitted by the given organization user; one or more organization departments of the organization with which the given organization user is associated; one or more organization responsibilities (e.g., assigned project(s) or task(s)) within the organization that the given organization user is currently undertaking or had undertaken in the past; and one or more success metrics indicating a level of success that the aforementioned organization responsibility/responsibilities have brought to the organization. Said business intent parameter(s) is/are not limited to the aforementioned specific examples.

In one or many embodiment(s) disclosed herein, a business intent, and thus a user business intent model (or portions thereof), respective to a given organization user, may be captured or recorded through any number of mechanisms. By way of an example, said business intent may be captured/recorded through direct input of one or more business intent parameters by the organization user. By way of another example, said business intent may be captured/recorded through information available within a strategy cascade (e.g., a strategic plan) outlining one or more organization goals, as well as the distribution thereof internally, for the organization for any one or more given periods of time. By way of yet another example, said business intent may be captured/recorded through gamification, which may entail the attempted input(s) or population(s) of one or more business intent parameters, by the organization user, via the creation of similar experiences to those experienced when playing games in order to motivate or engage the organization user. The capturing or recording of business intent is/are not limited to the aforementioned specific examples.

In one or many embodiment(s) disclosed herein, a business intent, and thus a user business intent model, respective to a given organization user and at any given point-in-time, may be associated with a completeness thereof. That is, a completeness of a business intent and/or the user business intent model may refer to a measurable degree (also referred to herein as a business intent score) to which the set of business intent parameters, representative of the business intent and/or user business intent model for the given organization user, may be known or captured at the given point-in-time.

In Step 306, a set of known business intent parameters is extracted from the user business intent model (obtained in Step 304). In one or many embodiment(s) disclosed herein, the set of known business intent parameters may include zero or more business intent parameters (described above—see e.g., Step 304) that may be captured or recorded for the organization user. As such, the set of known business intent parameters may be reflective of an empty set (i.e., including zero captured/recorded business intent parameters for the organization user) or a non-empty set (i.e., including at least one captured/recorded business intent parameter for the organization user).

In Step 308, a metadata graph is obtained. In one or many embodiment(s) disclosed herein, the metadata graph may refer to a connected graph (see e.g., FIG. 2A) representative of an asset catalog. To that end, the metadata graph may include a set of nodes interconnected by a set of edges, where the set of nodes are representative of asset catalog entries and the set of edges are representative of connections or relationships there-between. Further, each node may pertain to a given asset (e.g., any existing structured and/or unstructured form of information), where the representative asset catalog entry thereof may store metadata for, or information descriptive of, the given asset.

Examples of said asset metadata may include, but is not limited to: a brief description of the asset; stewardship (or ownership) information (e.g., individual or group name(s), contact information, etc.) pertaining to the steward(s)/owner(s) of the asset; a version character string reflective of a version or state of the asset at/for a given point-in-time; one or more categories, topics, and/or aspects associated with the asset; an asset identifier uniquely identifying the asset; one or more tags, keywords, or terms further describing the asset; a source identifier and/or location associated with an internal or external data source (see e.g., FIG. 1) where the asset resides or is maintained; and compliance information specifying laws, regulations, and standards surrounding the asset, as well as policies directed to data governance (e.g., availability, usability, integrity, and security) pertinent to the asset. The asset metadata for any asset is not limited to the aforementioned specific examples.

In Step 310, the metadata graph (obtained in Step 308) is filtered based on the search topic (received via the search query in Step 300). In one or many embodiment(s) disclosed herein, filtering of the metadata graph may, for example, entail topic matching (e.g., case-insensitive word or phrase matching) between the search topic and the asset metadata for assets catalogued in the asset catalog entries of which nodes of the metadata graph are representative. Further, filtering of the metadata graph based on the search topic may result in the identification of a node subset of the set of nodes forming the metadata graph. The identified node subset, subsequently, may include one or more nodes representative of one or more assets, respectively, that may be associated with the search topic.

In Step 312, for each known business intent parameter of the known business intent parameter(s) (if any) (extracted in Step 306), the metadata graph (obtained in Step 304) is filtered based on the known business intent parameter. In one or many embodiment(s) disclosed herein, filtering of the metadata graph may, for example, entail topic matching (e.g., case-insensitive word or phrase matching) between a given known business intent parameter and the asset metadata for assets catalogued in the asset catalog entries of which nodes of the metadata graph are representative. Further, for each known business intent parameter, the filtering of the metadata graph based thereon may result in the identification of a node subset of the set of nodes forming the metadata graph. The identified node subset, subsequently, may include one or more nodes representative of one or more assets, respectively, that may be associated with the known business intent parameter.

In Step 314, a k-partite metadata graph is generated using the node subsets (identified collectively in Steps 1010 and 1012). In one or many embodiment(s) disclosed herein, the k-partite metadata graph (see e.g., FIGS. 2B-2D) may reflect a new representation of, which may be based on one or more particular perspectives on, the metadata graph (obtained in Step 306). The k-partite metadata graph, further, may reflect a connected graph that encompasses k independent sets of nodes (i.e., the node subset(s), where k equals the number or cardinality of node subset(s)) and a set of edges interconnecting (and thus defining relationships between) pairs of nodes each belonging to a different independent set of nodes (or node subset)—with the exception of uni—(k=1) partite metadata graphs (see e.g., FIG. 2B) where the set of edges interconnect nodes of the single independent set of nodes (or single node subset) forming the uni-partite metadata graphs.

Turning to FIG. 3B, in Step 316, one or more super nodes, in/of the k-partite metadata graph (generated in Step 314), is/are identified. In one or many embodiment(s) disclosed herein, a super node may refer to a densely connected node or a node with a disproportionately high number of edges connected thereto. Additionally, or alternatively, a super node may be identified as any node representing a most connected node (e.g., any node that serves as an endpoint of a pair of endpoints to a highest number of edges) in the k-partite metadata graph, which may otherwise be defined as any node that serves as an endpoint of a pair of endpoints to a number of edges, where the number of edges meets or exceeds a threshold number of edges (that may be dynamically set). For example, the threshold number of edges may be set to ten edges, where any node(s) in the k-partite metadata graph that serves as an endpoint (of a pair of endpoints) to at least ten edges may be classified or labeled as a super node in/of the k-partite metadata graph.

Additionally, or alternatively, one or more most connected nodes, within one or more metadata subgraphs in/of the k-partite metadata graph (generated in Step 314), is/are identified. In one or many embodiment(s) disclosed herein, a metadata subgraph may generally refer to a connected graph that may be found within, and therefore may include at least a portion of the elements (e.g., a set of nodes interconnected by a set of edges) forming, a larger connected graph (e.g., the k-partite metadata graph). A most connected node within any metadata subgraph, accordingly, may be defined as any node found within the metadata subgraph that serves as an endpoint of a pair of endpoints to a second number of edges, where the second number of edges meets or exceeds a second threshold of edges (that may be dynamically set). For example, the second threshold of edges may be set to ten edges, where any node(s) found within any given metadata subgraph(s), in the k-partite metadata graph, that serves as an endpoint (of a pair of endpoints) to at least ten edges may be classified or labeled as a most connected node in/of the given metadata subgraph.

Additionally, or alternatively, one or more other nodes, which may be found in the k-partite metadata graph (generated in Step 314), is/are identified. In one or many embodiment(s) disclosed herein, the other node(s) may be identified based on the satisfaction of one or more other criteria. Examples of said criteria may include, but is not limited to: whether a node is positioned along a longest path traversing the k-partite metadata graph; and whether a node is positioned along a shortest path traversing the k-partite metadata graph.

In one or many embodiment(s) disclosed herein, the collective number of super node(s), most connected node(s), and other node(s) (identified in Step 316) may be directly correlated to the set of known business intent parameter(s) (extracted in Step 306). That is, the more business intent parameters captured/recorded for the organization user, and thus reflective of the set of known business intent parameter(s), the more super node(s), most connected node(s), and/or other node(s) that may be identified.

In Step 318, for each super node, most connected node, or other node (identified in Step 316), at least a portion of asset metadata, for an asset (e.g., any existing structured and/or unstructured form of information) corresponding to the super node, most connected node, or other node, is extracted. In one or many embodiment(s) disclosed herein, the extracted portion of asset metadata may include, but is not limited to, stewardship (or ownership) information and compliance information (both briefly defined above—see e.g., Step 308) associated with the asset.

In Step 320, the user access permissions (obtained in Step 302), associated with the organization user, is assessed against the compliance information (extracted in Step 318) associated with one or more assets. In one or many embodiment(s) disclosed herein, the asset(s) may map to asset catalog entry/entries represented by the super node(s), most connected node(s), and/or other node(s) (identified in Step 316).

Further, assessment of the user access permissions, against the asset compliance information, may, for example, entail determining: whether a geographical location of the organization user is within the geographical restrictions or boundaries, at least in part, defining access to an asset; whether the organization, with which the organization user is associated, is of a particular type (e.g., a commercial business, an educational institution, etc.) to which access and usability of an asset is granted; and whether one or more organization roles (e.g., title(s) and/or position(s)) and/or professional affiliation(s) (e.g., membership(s) to professional organization(s)), with which the organization user is associated, satisfies criteria for permitting access to an asset.

Moreover, the above-mentioned assessment, between the user access permissions and the asset compliance information, may result in producing access remarks that concern the asset(s) associated with the extracted compliance information. In one or many embodiment(s) disclosed herein, any access remarks may refer to information expressing whether the asset(s) is/are accessible or inaccessible to/by the organization user. Said information (for any given asset) may include, but is not limited to: an accessibility statement indicating that the given asset can or cannot be accessed by the organization user; one or more reasons explaining or supporting the accessibility statement; a digital reference link (e.g., uniform resource locator or hyperlink) or an access protocol through which the organization user can access the given asset should the accessibility statement indicate that the given asset can be accessed by the organization user; and/or the stewardship information (extracted in Step 318) associated with the given asset should the accessibility statement alternatively indicate that the given asset cannot be accessed by the organization user.

In one or many embodiment(s) disclosed herein, stewardship information may be integrated, as part of the access remarks for a given asset (if applicable—e.g., if the given asset is deemed inaccessible), in order to provide the organization user with an opportunity to potentially gain access to the given asset through communications with the steward(s) or owner(s) of the given asset. The potential to gain access to the given asset through this avenue, however, may be moot or disregarded in view of other, higher-tiered compliance policies such as those outlined by geographical restrictions, as well as national and/or international laws, regulations, and standards.

In Step 322, an asset availability, for each of one or more assets (e.g., any existing structured and/or unstructured form of information), is determined. In one or many embodiment(s) disclosed herein, the asset(s) may map to asset catalog entry/entries represented by the super node(s), most connected node(s), and/or other node(s) (identified in Step 316). Further, the determination of asset availability for any given asset may, for example, entail the submission of an asset availability query to an appropriate (i.e., internal or external) data source identified in the asset metadata describing the given asset. Any asset availability query may include or specify an asset identifier (also found in the asset metadata) that uniquely identifies the given asset. Moreover, in response to any asset availability query, a corresponding asset availability reply may be received, which may include or specify an asset availability state indicating whether the given asset is available (e.g., obtainable, usable, or reachable) or unavailable (e.g., unobtainable, unusable, or unreachable). Thereafter, the returned asset availability state(s) for the asset(s), respectively, may be used to produce availability remarks concerning the asset(s). Any availability remarks may refer to information expressing whether the asset(s) is/are available or unavailable at/on one or more data sources that the asset(s) currently reside, or at one time, had resided.

In Step 324, a business intent score, associated with the organization user, is computed. In one or many embodiment(s) disclosed herein, the business intent score may refer to a measurable degree to which the set of business intent parameters, representative of the business intent and/or user business intent model (obtained in Step 304) for the given organization user, may be known or captured at any given point-in-time. The business intent score, accordingly, may be based on or derived from the user business intent model or, more specifically, the set of known business intent parameters (extracted in Step 306). Further, by way of an example, the business intent score may be expressed as a percentage value reflecting a proportion or ratio of captured/recorded business intent parameter(s) to an entirety or total of business intent parameter(s).

In Step 326, search results are created. In one or many embodiment(s) disclosed herein, the search results may include or specify a manifest (or listing) of the asset(s) mapped to asset catalog entry/entries represented by the super node(s), most connected node(s), and/or other node(s) (identified in Step 316), the access remarks (produced in Step 320), the availability remarks (produced in Step 322), and the business intent score (computed in Step 324).

In one or many embodiment(s) disclosed herein, a recall may describe (or may be associated with) the above-mentioned manifest of asset(s). With respect to relevant information returned (e.g., the manifest of asset(s)) in response to any given search query (e.g., the search query received in Step 300), recall may refer to a measure of search relevance thereof or, more specifically, may reflect a percentage or quantity of said returned relevant information. Subsequently, a higher recall may be indicative of a larger set of relevant information (e.g., the more assets may be listed in the manifest of asset(s)) that may be returned to address the search query. Further, said recall describing the manifest of asset(s) may be contingent (or depend) on a completeness (described above) of the user business intent model (obtained in Step 304). That is, the higher the number of known business intent parameters (extracted in Step 306), the higher the recall and, by association, the higher the percentage or quantity of returned relevant information.

In Step 328, the search results (created in Step 326) are provide in response to the search query (received in Step 300). Particularly, in one or many embodiment(s) disclosed herein, the search results may be provided to the organization user who had submitted the search query.

Figure 4:
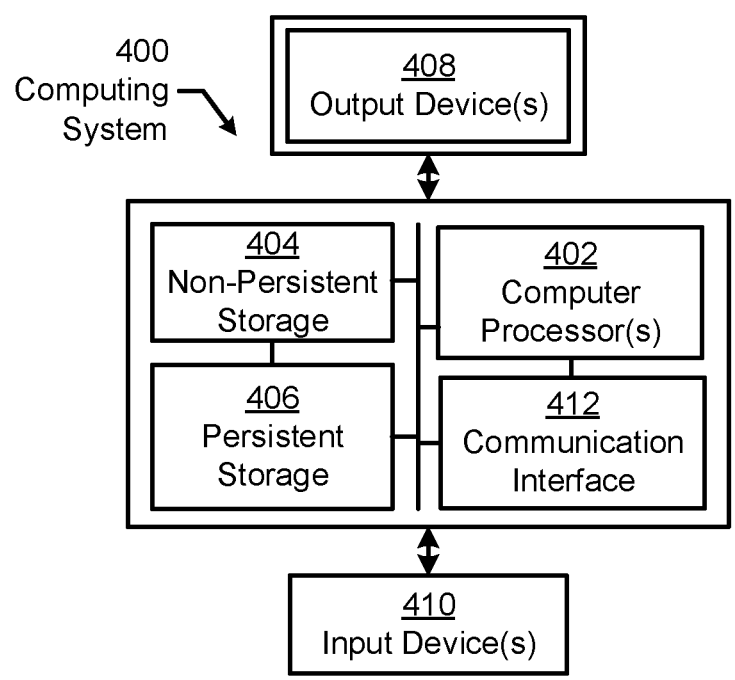
FIG. 4 shows an example computing system in accordance with one or more embodiments disclosed herein.

FIG. 4 shows an example computing system in accordance with one or more embodiments disclosed herein. The computing system (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment disclosed herein, the computer processor(s) (402) may be an integrated circuit for processing instructions. For example, the computer processor(s) may be one or more cores or micro-cores of a central processing unit (CPU) and/or a graphics processing unit (GPU). The computing system (400) may also include one or more input devices (410), such as a touchscreen, keyboard, mouse, microphone, touchpad, electronic pen, or any other type of input device. Further, the communication interface (412) may include an integrated circuit for connecting the computing system (400) to a network (not shown) (e.g., a local area network (LAN), a wide area network (WAN) such as the Internet, mobile network, or any other type of network) and/or to another device, such as another computing device.

In one embodiment disclosed herein, the computing system (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing systems exist, and the aforementioned input and output device(s) may take other forms.

Software instructions in the form of computer readable program code to perform embodiments disclosed herein may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments disclosed herein.

FIGS. 5A-5Q show example scenarios in accordance with one or more embodiments disclosed herein. The example scenarios, illustrated through FIGS. 5A-5Q and described below, are for explanatory purposes only and not intended to limit the scope disclosed herein.

A first example scenario (illustrated and described with respect to FIGS. 5A-5H, below) considers an organization user, identified as Betty, whom seeks to obtain any asset(s) (e.g., any existing structured and/or unstructured form(s) of information) respective to the quantum computing (QC) space in order to address certain business goals. A completeness of a user business intent model for Betty, however, is limited and, as such, so is the search results to her search query. A second example scenario (illustrated and described with respect to FIGS. 5I-5Q, below) considers another organization user, identified as Sam, whom also seeks to obtain any asset(s) respective to the QC space also in order to address certain business goals. A user business intent model for Sam is more complete (than the model for Betty)

and, accordingly, the search results Sam receives in response to his search query also cites more assets.

To their respective ends, Betty and Sam both rely on the disclosed capability of business intent-assisted search by the insight service to achieve their respective business goals. Interactions amongst various actors—e.g., a Client Device A (500A) operated by Betty, a Client Device B (500B) operated by Sam, the Insight Service (502), and two separate data sources (i.e., Data Source A (504A) and Data Source B (504B))—are illustrated in conjunction with components shown across FIGS. 5A-5Q and described (in an itemized manner) below. Said interactions, as well as processes performed on/by any particular actor may follow embodiments disclosed herein pertaining to business intent-assisted search as applied to the circumstances of the example scenarios.

Figure 5C:
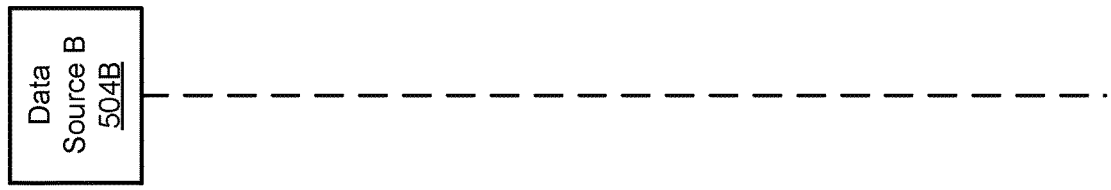
FIGS. 5A-5Q show example scenarios in accordance with one or more embodiments disclosed herein.
Figure 5C:
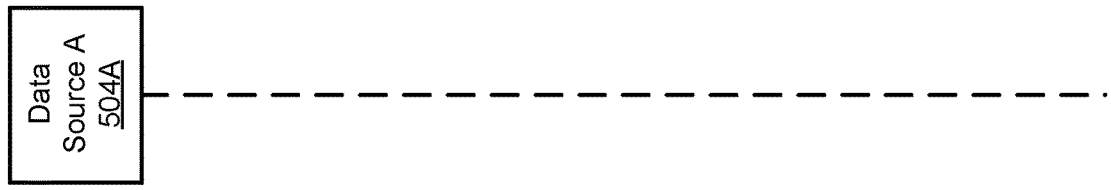
Figure 5C:
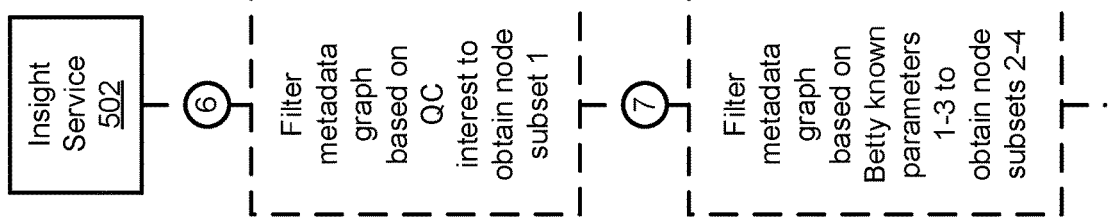
Figure 5C:
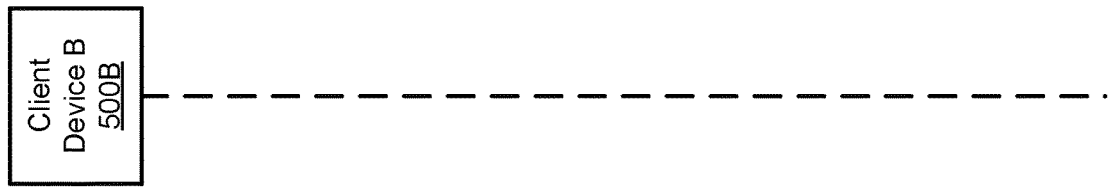
Figure 5C:
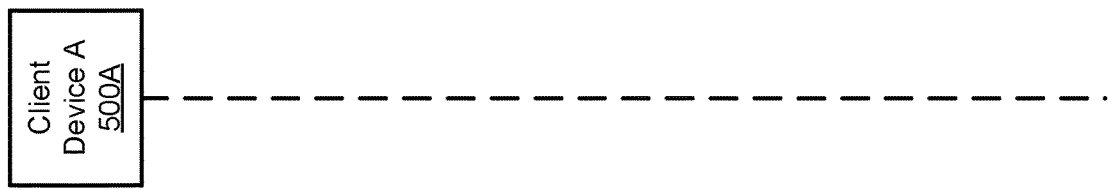
Figure 5D:
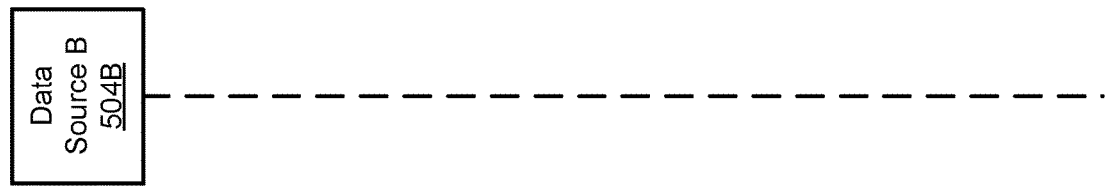
Figure 5D:
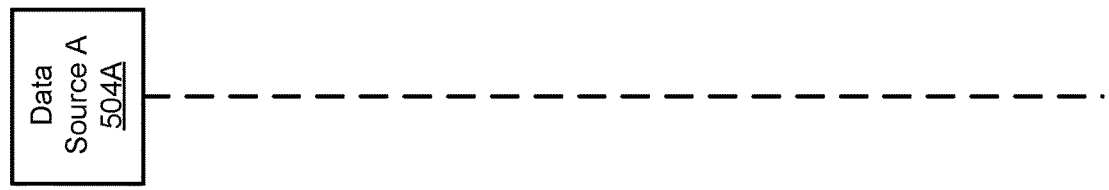
Figure 5D:
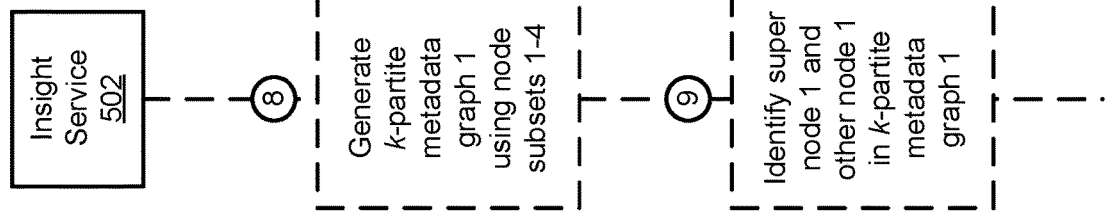
Figure 5D:
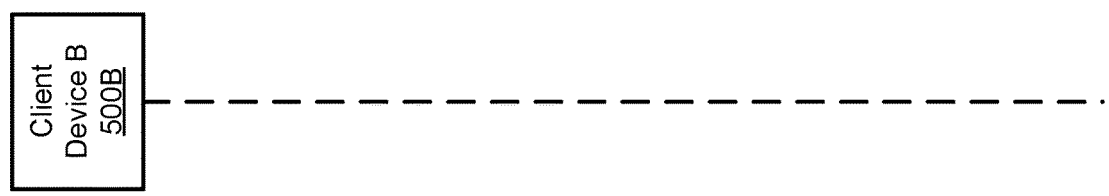
Figure 5D:
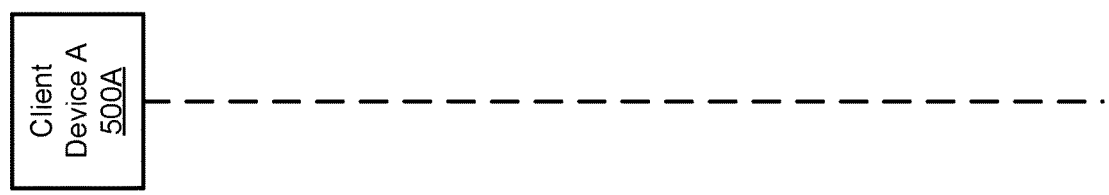
Figure 5G:
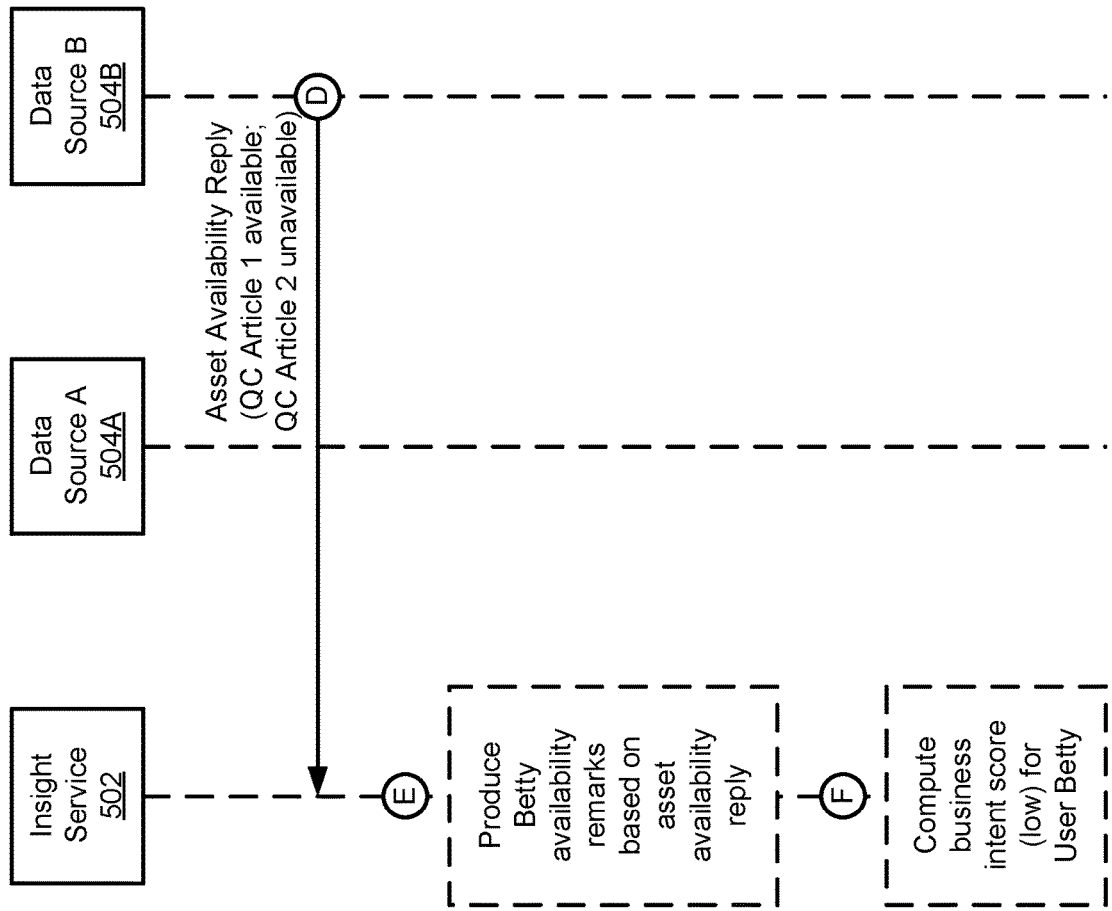
Figure 5L:
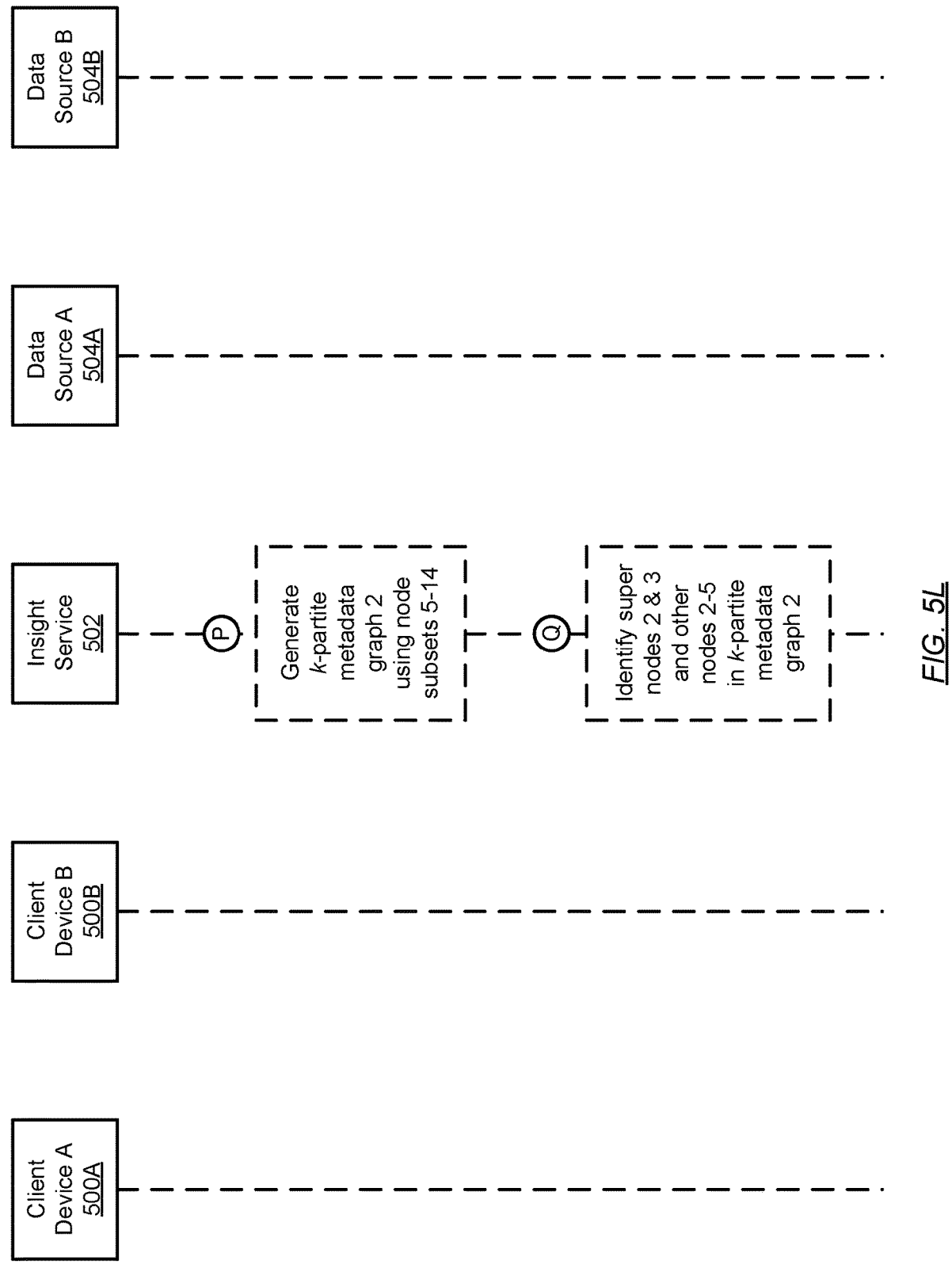
Figure 5N:
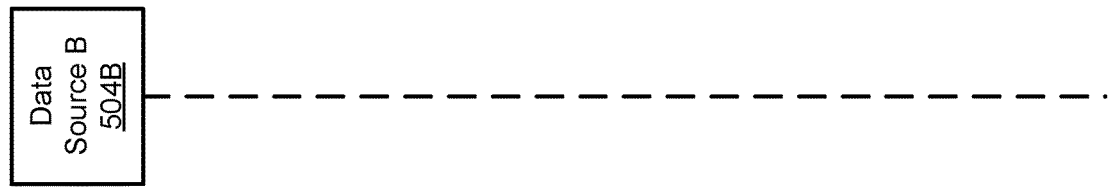
Figure 5N:
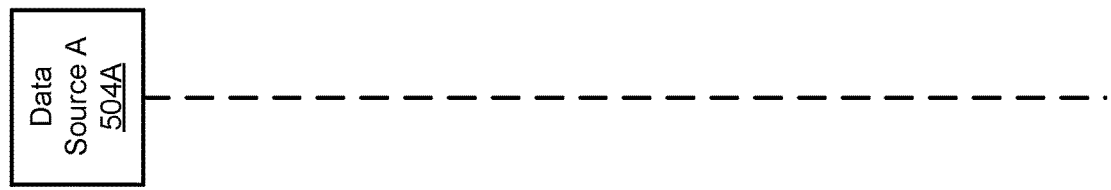
Figure 5N:
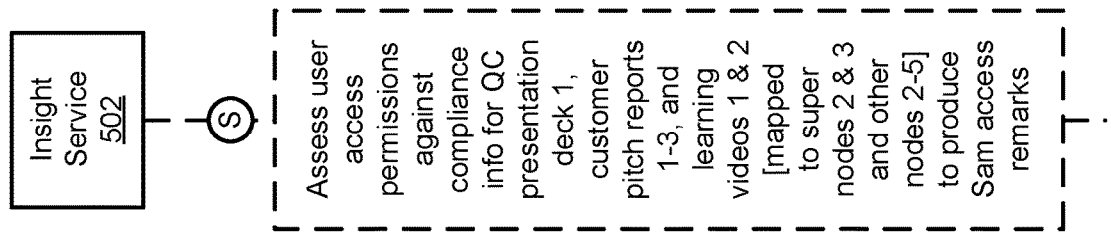
Figure 5N:
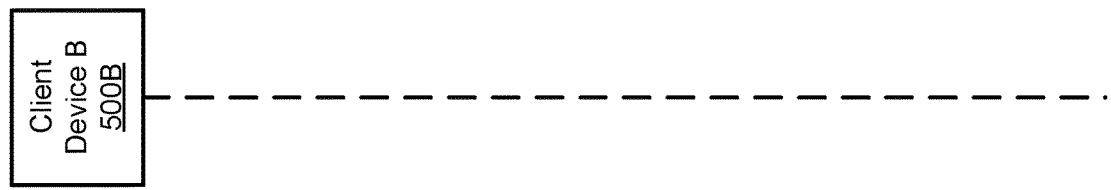
Figure 5N:
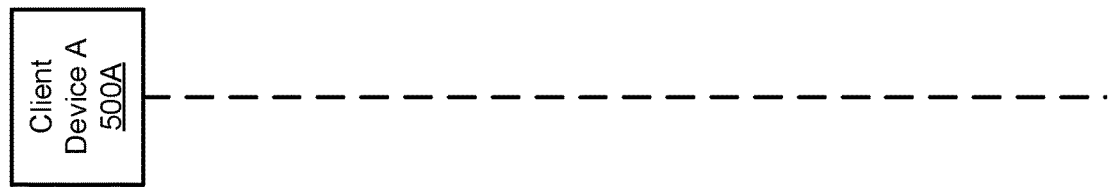
Figure 5P:
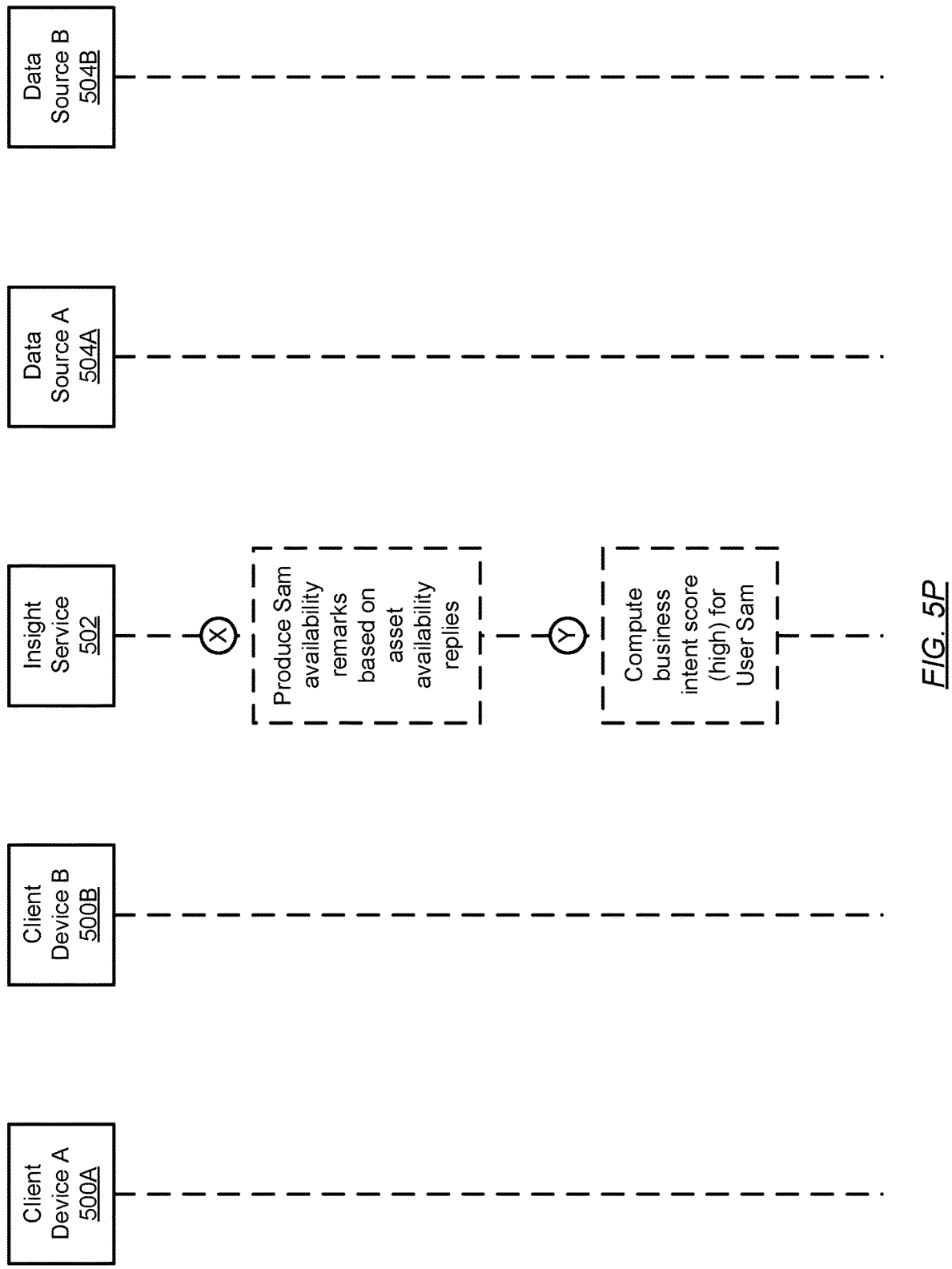

Turning to FIG. 5A:
1. User Betty, operating Client Device A (500A), submits a search query to the Insight Service (502), where the search query specifies QC as the search topic
2. The Insight Service (502) obtains a user profile for User Betty, where the user profile includes user access permissions associated with User Betty
3. The Insight Service (502) further obtains a user business intent model for User Betty, where the user business intent model is represented via a superset of business intent parameters Turning to FIG. 5B:
4. The Insight Service (502) extracts known business intent parameters 1-3 from the superset of business intent parameters representative of the obtained user business intent model for User Betty
5. The Insight Service (502) obtains a metadata graph representative of an asset catalog Turning to FIG. 5C:
6. Based on the search topic of QC, the Insight Service (502) filters the metadata graph to identify node subset 1 of a set of nodes, at least in part, forming the metadata graph, where node subset 1 includes one or more nodes corresponding to asset catalog entry/entries each specifying asset metadata (or at least a portion thereof) matching the search topic of QC
7. Based on each of the known business intent parameters 1-3, the Insight Service (502) filters the metadata graph to identify node subsets 2-4 (e.g., known business intent parameter 1→node subset 2; known business intent parameter 2→node subset 3; known business intent parameter 3→node subset 4) of a set of nodes, at least in part, forming the metadata graph, where each of node subsets 2-4 includes one or more nodes corresponding to asset catalog entry/entries each specifying asset metadata (or at least a portion thereof) matching a respective known business intent parameter Turning to FIG. 5D:
8. The Insight Service (502) generates k-partite (i.e., multi-partite) metadata graph 1 using node subsets 1-4
9. The Insight Service (502) identifies super node 1 and other node 1 in/of k-partite metadata graph 1

Turning to FIG. 5E:
A. The Insight Service (502) extracts a portion of asset metadata from asset catalog entries corresponding to super node 1 and other node 1, where the portion of asset metadata includes stewardship information and compliance information associated with assets (e.g., QC articles 1 & 2) to which the extracted portion of asset metadata belongs Turning to FIG. 5F:
B. The Insight Service (502) assesses the user access permissions (associated with User Betty) against the compliance information for the assets (e.g., QC articles 1 & 2) mapped respectively to super node 1 and other node 1, where the assessment leads to the production of User Betty access remarks (e.g., QC article 1 is deemed accessible, whereas QC article 2 is deemed inaccessible, to/by User Betty) concerning the assets
C. To ascertain an asset availability for the assets (e.g., QC articles 1 & 2), the Insight Service (502) submits an asset availability query to Data Source B (504B) which is identified as the host of the assets amongst the asset metadata thereof, where the asset availability query includes unique asset identifiers (QC articles 1 & 2 IDs) associated with the assets Turning to FIG. 5G:
D. In response to the submitted asset availability query regarding QC articles 1 & 2, Data Source B (504B) returns an asset availability reply to the Insight Service (502), where the asset availability reply specifies asset availability states indicating that QC article 1 is available while QC article 2 is unavailable
E. The Insight Service (502) subsequently produces User Betty availability remarks concerning QC articles 1 & 2 based on the returned asset availability reply
F. The Insight Service (502) computes a business intent score for User Betty, where the business intent score reflects a low value (e.g., 5%) based on what little information (i.e., known business intent parameters 1-3) is captured in the user business intent model for User Betty Turning to FIG. 5H:
G. The Insight Service (502) creates search results 1 including a manifest listing QC articles 1 & 2, as well as the produced User Betty access remarks, the produced User Betty availability remarks, and the computed business intent score for User Betty
H. In response to the submitted search query, the Insight Service (502) provides search results 1 to Client Device A (500A) or, more specifically, to User Betty Turning to FIG. 5I:
I. User Sam, operating Client Device B (500B), submits a search query to the Insight Service (502), where the search query specifies QC as the search topic
J. The Insight Service (502) obtains a user profile for User Sam, where the user profile includes user access permissions associated with User Sam
K. The Insight Service (502) further obtains a user business intent model for User Sam, where the user business intent model is represented via a superset of business intent parameters Turning to FIG. 5J:
L. The Insight Service (502) extracts known business intent parameters 1-9 from the superset of business intent parameters representative of the obtained user business intent model for User Sam
M. The Insight Service (502) re-obtains the metadata graph representative of an asset catalog Turning to FIG. 5K:
N. Based on the search topic of QC, the Insight Service (502) filters the metadata graph to identify node subset 5 of a set of nodes, at least in part, forming the metadata graph, where node subset 5 includes one or more nodes corresponding to asset catalog entry/entries each specifying asset metadata (or at least a portion thereof) matching the search topic of QC O. Based on each of the known business intent parameters 1-9, the Insight Service (502) filters the metadata graph to identify node subsets 6-14 (e.g., known business intent parameter 1→node subset 6; known business intent parameter 2→node subset 7; known business intent parameter 3→node subset 8; known business intent parameter 4→node subset 9; known business intent parameter 5→node subset 10; known business intent parameter 6→node subset 11; known business intent parameter 7→node subset 12; known business intent parameter 8→node subset 13; known business intent parameter 9→node subset 14) of a set of nodes, at least in part, forming the metadata graph, where each of node subsets 6-14 includes one or more nodes corresponding to asset catalog entry/entries each specifying asset metadata (or at least a portion thereof) matching a respective known business intent parameter Turning to FIG. 5L:

P. The Insight Service (502) generates k-partite (i.e., multi-partite) metadata graph 2 using node subsets 6-14

Q. The Insight Service (502) identifies super nodes 2 & 3 and other nodes 2-5 in/of k-partite metadata graph 2

Turning to FIG. 5M:

R. The Insight Service (502) extracts a portion of asset metadata from asset catalog entries corresponding to super nodes 2 & 3 and other nodes 2-5, where the portion of asset metadata includes stewardship information and compliance information associated with assets (e.g., QC presentation deck, QC customer pitch reports 1-3, and QC learning videos 1 & 2) to which the extracted portion of asset metadata belongs Turning to FIG. 5N:

S. The Insight Service (502) assesses the user access permissions (associated with User Sam) against the compliance information for the assets (e.g., QC presentation deck, QC customer pitch reports 1-3, and QC learning videos 1 & 2) mapped respectively to super nodes 2 & 3 and other nodes 2-5, where the assessment leads to the production of User Sam access remarks (e.g., QC presentation deck, QC customer pitch report 3, and QC learning video 1 are deemed accessible, whereas QC customer reports 1 & 2 and QC learning video 2 are deemed inaccessible, to/by User Sam) concerning the assets Turning to FIG. 5O:

T. To ascertain an asset availability for some of the assets (e.g., QC presentation deck and QC customer pitch reports 1-3), the Insight Service (502) submits an asset availability query to Data Source A (504A) which is identified as the host of these assets amongst the asset metadata thereof, where the asset availability query includes unique asset identifiers (QC presentation deck and QC customer pitch reports 1-3 IDs) associated with these assets U. To ascertain an asset availability for the remaining assets (e.g., QC learning videos 1 & 2), the Insight Service (502) submits an asset availability query to Data Source B (504B) which is identified as the host of these remaining assets amongst the asset metadata thereof, where the asset availability query includes unique asset identifiers (QC learning videos 1 & 2 IDs) associated with these remaining assets V. In response to the submitted asset availability query regarding the QC presentation deck and QC customer pitch reports 1-3, Data Source A (504A) returns an asset availability reply to the Insight Service (502), where the asset availability reply specifies asset availability states indicating that the QC presentation deck and QC customer pitch reports 1 & 3 are available while QC customer pitch report 2 is unavailable W. In response to the submitted asset availability query regarding QC learning videos 1 & 2, Data Source B (504B) returns an asset availability reply to the Insight Service (502), where the asset availability reply specifies asset availability states indicating that QC learning videos 1 & 2 are available Turning to FIG. 5P:

X. The Insight Service (502) subsequently produces User Sam availability remarks concerning the QC presentation deck, QC customer pitch reports 1-3, and QC learning videos 1 & 2 based on the returned asset availability replies Y. The Insight Service (502) computes a business intent score for User Sam, where the business intent score reflects a moderate value (e.g., 35%) based on what modest information (i.e., known business intent parameters 1-9) is captured in the user business intent model for User Sam Turning to FIG. 5Q:

Z. The Insight Service (502) creates search results 2 including a manifest listing the QC presentation deck, QC customer pitch reports 1-3, and QC learning videos 1 & 2, as well as the produced User Sam access remarks, the produced User Sam availability remarks, and the computed business intent score for User Sam a. In response to the submitted search query, the Insight Service (502) provides search results 2 to Client Device B (500B) or, more specifically, to User Sam While the embodiments disclosed herein have been described with respect to a limited number of embodiments, those skilled in the art, having benefit of this disclosure, will appreciate that other embodiments can be devised which do not depart from the scope disclosed herein as disclosed herein. Accordingly, the scope disclosed herein should be limited only by the attached claims.

What is claimed is:

1. A method for processing search queries, the method comprising:

receiving a search query comprising a search topic;

obtaining a metadata graph representative of an asset catalog;

filtering, based on the search topic, the metadata graph to identify a first node subset;

filtering, based on a set of known business intent parameters, the metadata graph to identify a set of second node subsets;

generating a k-partite metadata graph using the first node subset and the set of second node subsets; and creating search results based on the k-partite metadata graph, wherein creating the search results based on the k-partite metadata graph, comprises:

identifying a super node in the k-partite metadata graph;

extracting first asset metadata from a first asset catalog entry of the asset catalog, wherein the first asset metadata describes a first asset and the first asset catalog entry corresponds to the super node;

determining a first asset availability for the first asset;

producing availability remarks comprising the first asset availability; and creating the search results comprising a manifest of assets and the availability remarks, wherein the manifest of assets lists the first asset.

2. The method of claim 1, wherein the super node is representative of a node in the k-partite metadata graph that is an endpoint for a number of edges, wherein the number of edges at least satisfies a threshold number of edges.

3. The method of claim 1, wherein creating the search results based on the k-partite metadata graph, further comprises:
prior to creating the search results:
identifying a metadata subgraph within the k-partite metadata graph;
identifying a most connected node of the metadata graph;
extracting second asset metadata from a second asset catalog entry of the asset catalog,
wherein the second asset metadata describes a second asset and the second asset catalog entry corresponds to the most connected node;
determining a second asset availability for the second asset; and
amending the availability remarks to further comprise the second asset availability,
wherein the manifest of assets further lists the second asset.

4. The method of claim 3, wherein creating the search results based on the k-partite metadata graph, further comprises:
prior to creating the search results:
identifying another node in the k-partite metadata graph,
wherein the other node satisfies an identification criterion;
extracting third asset metadata from a third asset catalog entry of the asset catalog,
wherein the third asset metadata describes a third asset and the third asset catalog entry corresponds to the other node;
determining a third asset availability for the third asset; and
amending the availability remarks to further comprise the third asset availability,
wherein the manifest of assets further lists the third asset.

5. The method of claim 4, wherein the identification criterion is one selected from a group of criterions comprising a first node positioned along a longest path traversing the k-partite metadata graph and a second node positioned along a shortest path traversing the k-partite metadata graph.

6. The method of claim 4, the method further comprising:
prior to obtaining the metadata graph:
obtaining a user profile for an organization user,
wherein the search query originates from the organization user and the user profile comprises user access permissions associated with the organization user; and
prior to determining the first asset availability:
performing a first assessment of the user access permissions against first compliance information associated with the first asset,
wherein the first asset metadata comprises the first compliance information; and
producing access remarks based on the first assessment, wherein the search results further comprise the access remarks.

7. The method of claim 6, the method further comprising:
prior to determining the second asset availability:
performing a second assessment of the user access permissions against second compliance information associated with the second asset,
wherein the second asset metadata comprises the second compliance information,
wherein the access remarks are further produced based on the second assessment.

8. The method of claim 7, the method further comprising:
prior to determining the third asset availability:
performing a third assessment of the user access permissions against third compliance information associated with the third asset,
wherein the third asset metadata comprises the third compliance information,
wherein the access remarks are further produced based on the third assessment.

9. The method of claim 6, wherein the first assessment results in the first asset being deemed inaccessible to the organization user, wherein the first asset metadata comprises stewardship information associated with the first asset, and wherein the access remarks, at least concerning the first asset, comprises an accessibility statement indicating that the first asset is inaccessible to the organization user, at least one reason supporting the accessibility statement, and the stewardship information.

10. The method of claim 6, the method further comprising:
after creating the search results:
providing, in response to the search query, the search results to the organization user.

11. The method of claim 6, the method further comprising:
after obtaining the user profile for the organization user:
obtaining a user business intent model for the organization user; and
extracting the set of known business intent parameters from the user business intent model.

12. The method of claim 11, wherein a recall describing the manifest of assets is contingent on a completeness of the user business intent model.

13. The method of claim 11, the method further comprising:
prior to creating the search results:
computing, for the organization user, a business intent score based on the user business intent model,
wherein the search results further comprises the business intent score.

14. A non-transitory computer readable medium (CRM) comprising computer readable program code, which when executed by a computer processor, enables the computer processor to perform a method for processing search queries, the method comprising:
receiving a search query comprising a search topic;
obtaining a metadata graph representative of an asset catalog;
filtering, based on the search topic, the metadata graph to identify a first node subset;
filtering, based on a set of known business intent parameters, the metadata graph to identify a set of second node subsets;
generating a k-partite metadata graph using the first node subset and the set of second node subsets; and creating search results based on the k-partite metadata graph, wherein creating the search results based on the k-partite metadata graph, comprises:
    identifying a super node in the k-partite metadata graph;
    extracting first asset metadata from a first asset catalog entry of the asset catalog,
        wherein the first asset metadata describes a first asset and the first asset catalog entry corresponds to the super node;
    determining a first asset availability for the first asset;
    producing availability remarks comprising the first asset availability; and
    creating the search results comprising a manifest of assets and the availability remarks,
        wherein the manifest of assets lists the first asset.

15. The non-transitory CRM of claim 14, the method further comprising:
    prior to obtaining the metadata graph:
        obtaining a user profile for an organization user,
            wherein the search query originates from the organization user and the user profile comprises user access permissions associated with the organization user; and
    prior to determining the first asset availability:
        performing a first assessment of the user access permissions against first compliance information associated with the first asset,
            wherein the first asset metadata comprises the first compliance information; and
        producing access remarks based on the first assessment,
    wherein the search results further comprise the access remarks.

16. The non-transitory CRM of claim 15, the method further comprising:
    after obtaining the user profile for the organization user:
        obtaining a user business intent model for the organization user; and
        extracting the set of known business intent parameters from the user business intent model.

17. The non-transitory CRM of claim 16, wherein a recall describing the manifest of assets is contingent on a completeness of the user business intent model.

18. A system, the system comprising:
    a client device; and
    an insight service operatively connected to the client device, and comprising a computer processor configured to perform a method for processing search queries, the method comprising:
        receiving, from the client device, a search query comprising a search topic;
        obtaining a metadata graph representative of an asset catalog;
        filtering, based on the search topic, the metadata graph to identify a first node subset;
        filtering, based on a set of known business intent parameters, the metadata graph to identify a set of second node subsets;
        generating a k-partite metadata graph using the first node subset and the set of second node subsets; and
    creating search results based on the k-partite metadata graph, wherein creating the search results based on the k-partite metadata graph, comprises:
        identifying a super node in the k-partite metadata graph;
        extracting first asset metadata from a first asset catalog entry of the asset catalog, wherein the first asset metadata describes a first asset and the first asset catalog entry corresponds to the super node;
        determining a first asset availability for the first asset;
        producing availability remarks comprising the first asset availability; and
        creating the search results comprising a manifest of assets and the availability remarks,
            wherein the manifest of assets lists the first asset.

\* \* \* \* \*